United States Patent
Cook et al.

[15] 3,705,759
[45] Dec. 12, 1972

[54] OPTICAL OBJECTIVE OF VARIABLE FOCAL LENGTH

[72] Inventors: Gordon Henry Cook, Oadby, England; Francois Laurent, Yverdon, Switzerland

[73] Assignee: The Rank Organisation Limited, London, England

[22] Filed: Dec. 18, 1970

[21] Appl. No.: 99,537

Related U.S. Application Data

[63] Continuation-in-part of Ser. No. 39,122, May 20, 1970, abandoned, which is a continuation-in-part of Ser. No. 696,443, Jan. 8, 1968, abandoned.

[30] Foreign Application Priority Data

May 20, 1970 Great Britain.....................39,112/70

[52] U.S. Cl..................................350/184, 350/186
[51] Int. Cl........................G02b 15/16, G02b 15/18
[58] Field of Search.............................350/184, 186

[56] References Cited

UNITED STATES PATENTS 3,152,211  10/1964  Cox et al. ............................350/184

Primary Examiner—David Schonberg
Assistant Examiner—Paul A. Sacher
Attorney—Griffin Branigan and Kindness

[57] ABSTRACT

The invention relates to an optical objective for photographic or other purposes, having movable members disposed between front and rear members which are normally stationary, whereby the equivalent focal length of the objective can be continuously varied while maintaining constant the position of the image plane, and in particular concerns a zoom lens having a divergent front member, a convergent second member, a divergent third member, a convergent fourth member and a divergent fifth member, wherein the second and fourth members move forwardly and the third member simultaneously moves rearwardly for zooming towards maximum focal length and wherein the zooming system constituted by the first four members is characterized by a number of specified mathematical relationships involving the focal lengths and magnification ratios of the second, third and fourth members.

15 Claims, 9 Drawing Figures

OPTICAL OBJECTIVE OF VARIABLE FOCAL LENGTH

The present application for a continuation-in-part in part of copending application Ser. No. 39,122 filed May 20, 1970 now abandoned which is itself a continuation-in-part of copending application Ser. No. 696,443 filed Jan. 8, 1968, now abandoned.

BACKGROUND OF THE INVENTION

1. Prior Art

Various types of zoom lens are known, most of which may conveniently be considered as comprising front and rear assemblies, of which the rear assembly is stationary, the members movable for zooming being included in the front assembly. Usually, such an objective is provided with four or five members, a stationary rear member constituting the rear assembly and two or three members movable for zooming to the rear of a front member which is stationary as far as zooming is concerned, these last-mentioned members constituting the front assembly. The provision for focusing is usually made the front member of the front assembly.

In this connection, it should be made clear that the terms "front" and "rear" as used herein relate respectively to the sides of the objective nearer to and further from the longer conjugate, in accordance with the usual convention.

It is a difficult problem in the design of a zoom lens simultaneously to cover a wide angular field of view at minimum equivalent focal length, to provide, within given size and weight requirements, for a desired, often wide, range of variation of focal length with an acceptable law of relative movement and to make possible the use of a front member which can achieve focusing down to a very short object distance. The main reason for difficulty in designing an objective with such a "-wide target specification" is that of achieving an optimum thin lens solution which is compatible with minimum difficulty in effecting aberration correction in a practical objective.

2. Prior Applications

The latter and earlier application describes two practical examples of corrected zoom objective providing a solution to the above-described problem, and defines a range of optimized thin lens constructions on the basis of which other fully corrected examples can be developed.

According to the invention of said earlier application, a variable focal length objective comprises a stationary rear assembly of one or more divergent members and a front assembly comprising four members of which the front member is divergent and stationary with respect to zooming and of which the second, third and fourth members are respectively convergent, divergent and convergent, the second and fourth members simultaneously moving forward for zooming towards maximum focal length in association with rearward movement of the third member. The objective is characterized by the following features in combination:

(a) $1.8 Fm/N > f_2 > 0.6 Fm/N$
(b) $f_2 > f_4$
(c) $\sqrt[3]{R} > g_2 > 1$
(d) $\sqrt[3]{R} > g_4 > g_2$ (e) $$\frac{2(f_2+f_4)-x}{3} > f_3 > \frac{2(f_2+f_4)-x}{6}$$

(f) $\sqrt[1.5]{R} > g_3 > g_4,$ where $Fm$ is the maximum value of the equivalent focal length of the complete objective; $N$ is the relative aperture of $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; $R$ is the ratio of the maximum to minimum focal lengths of the complete objective; and $x$ is the mean value of the sum of the distances from the rear nodal point of the second member to the front nodal point of the third member and from the rear nodal point of the third member to the front nodal point of the fourth member.

The later copending continuation in part application describes three further practical examples of corrected zoom objective exhibiting a wide range of variation of focal length. These further examples are characterized by a particular structural form of the second, third and fourth members of the objective which enables a particularly high level of aberration correction to be achieved. The development of these further examples has revealed, in particular, that relationship (e) referred to in the earlier application is not so important as originally thought and that, to suit the particular structural form of the second, third and fourth members employed in the examples of the later application, $f_3$ should preferably be selected within a slightly different range. Thus, the later application defines a different but overlapping range of optimized thin lens constructions on the basis of which further fully corrected examples can be developed.

According to the invention of said later and continuation in part application, an optical zoom objective comprises a stationary rear assembly and a front assembly comprising four members of which the front member is divergent and stationary with respect to zooming and of which the second, third and fourth members are respectively convergent, divergent and convergent, the second and fourth members simultaneously moving forward during zooming towards maximum equivalent focal length in association with rearward movement of the third member, the said front assembly conforming to the relationships:

(a) $1.8 Fm/N > f_2 > 0.6 Fm/N$;
(b) $f_2 > f_4 > 0.6 f_2$;
(c) $\sqrt[3]{R} > g_2 > 1$;
(d) $\sqrt[3]{R} > g_4 > g_2$;

(e) $$\frac{2(f_2+f_4)-x}{2.5} > f_3 > \frac{2(f_2+f_4)-x}{5}$$

(f) $\sqrt[1.5]{R} > g_3 > g_4,$ where $Fm$ is the maximum value of the equivalent focal length of the complete objective; $N$ is the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; $R$ is the ratio of the maximum to the minimum equivalent focal lengths of the complete objective, and $x$ is the mean value of the sum of the distances from the rear nodal point of the second member to the front nodal point of the third member and from the rear nodal point of the third member to the front nodal point of the fourth member.

To make possible the above-mentioned high level of aberration correction, in particular extremely good aberration stabilization during zooming, especially of coma, the second member comprises two convergent compound components followed by a rear simple convergent component, the third member comprises a front simple divergent component and a divergent compound component spaced behind the simple component by a separation lying between $0.5f_3$ and $f_3$, and the fourth member comprises a compound convergent component followed by a simple convergent component.

OBJECT OF THE PRESENT INVENTION

The object of the present invention is to provide a number of new examples of the same family as those referred to above, and more particularly to present the complete range of examples within the framework of a rationalized range of optimized thin lens constructions which defines the family of objectives to which all the examples belong.

The examples of zoom objective described in the earlier applications are more especially intended for use in live television photography, and a further object of the present invention is to provide analogous examples of zoom objective particularly suited to cinemaphotography, where a smaller range of variation of equivalent focal length is necessary, but requirements as to size, weight and optical requirements are more severe.

SUMMARY OF THE INVENTION

Briefly, the invention resides in the determination of a range of optimized thin lens constructions within the framework of which are provided a range of fully corrected thick lens constructions, some such constructions being more especially suited to television photography and some to cinemaphotography, having due regard to the differing predominant requirements of the two industries. Within the defined framework further examples can be developed, for example for special purposes in which a "wide target specification" is again required, but emphasis on different requirements is necessary.

According to the invention there is provided an optical objection of variable focal length comprising a stationary rear assembly and a front assembly comprising four members of which the front member is divergent and stationary with respect to zooming and of which the second, third and fourth members are respectively convergent, divergent and convergent, the second and fourth members simultaneously moving forward during zooming towards maximum equivalent focal length in association with rearward movement of the third member, the said front assembly conforming to the relationships:

(a) $2.5Fm/N > f_2 > f_4 > f_3 > 1$
(b) $\sqrt[1.5]{R} > g_3 > g_4 > g_2 > 1$, where $Fm$ is the maximum value of the equivalent focal length of the complete objective; $N$ is the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; and R is the ratio of the maximum to the minimum equivalent focal lengths of the complete objective.

The above relationships relating to thin lens parameters define the limits for optimum thin lens designs which are compatible with the selection of thick lens parameters in a fully corrected practical objective. Thus, in the production of a substantial number of fully corrected examples, a number of specific optimized thin lens constructions have been developed, which has enabled the possible variations in individual thin lens parameters to be investigated in order to determine the limits of such variations beyond which the production of fully corrected examples is not possible or any such examples if produced cease to fulfil the stated object of the invention, i.e., the achievement of a wide target specification.

More specifically, a limitation on $f_2$ in relationship to $Fm/N$ is necessary to achieve a satisfactory compromise between the overall length of the objective, the overall diameter of the objective, especially at the front, and the relative apertures of the various members of the objective. A lower value of $f_2$ within the permitted range is desirable for a larger zoom ratio. In order to keep the absolute value of the overall length of the objective as small as possible, it is readily seen that $f_2$ should be greater than $f_4$, as the second member plays a more important part in the zooming action. These two limitations on $f_2$, in combination, ensure that the absolute value of the overall diameter is kept down to a practical value.

The relationships involving $f_2$ are of prime importance because the second member is critical, in particular, in determining the overall diameter of the objective. However, this same member is also most important in the context of stabilization of aberrations throughout the zooming range. The investigation of thin lens designs has shown that practical thick lens parameters can only readily be developed in this member when its overall magnification $g_2$ is appropriately restricted to be less than $g_4$, thereby to avoid the necessity of employing individual surfaces of unusually high power. $g_4$ can be higher, but should still be less than $g_3$ to permit development of practical thick lens parameters in the third member. Further, if $f_2$, $g_2$ are appropriately selected in relation to $f_4$, $g_4$, it is possible to achieve an exactly parallel movement of the second and fourth members, which in turn makes for a substantial practical mechanical advantage of a simple law of relative movement between the zooming members.

Following on the above, the focal length $f_3$ of the third member must be restricted in relation to those of the second and fourth members, on the one hand to avoid possibility of impractical construction involving negative air separations and on the other hand to assist in minimizing the overall length of the objective. Again, in order to permit the development of practical thick lens parameters in a fully corrected objective, $g_3$ must be restricted, conveniently in relation to R, bearing in mind that $R = g_2 \cdot g_3 \cdot g_4$.

Adherence to the specified relationships determines the general positions of the nodal points in a thick lens design, which in turn leads to the relationship $f_1 > f_2$. This, in a zoom lens of the general type specified, makes possible focusing down to unusually short object distances. In practice it is preferred that $f_1 < 1.5f_2$.

In the light of the above it will clearly be understood how the basic relationships lead to a thin lens design making possible a practical zoom lens having the wide specification required.

EXPLANATION OF THE INVENTION

In accordance with the invention, the objective has a front assembly which comprises a divergent front member which is stationary with respect to zooming, followed by a convergent second member, a divergent third member and a convergent fourth member. The second, third and fourth members are axially movable simultaneously for zooming, the second and fourth members moving forwardly, conveniently equally, at the same time as the third member moves rearwardly, as the equivalent focal length of the complete objective is increased. The law determining the movement of the third member is clearly related to that governing the equal movements of the second and fourth members, in order to maintain constant the position of the image plane.

The rear assembly comprises a rear member, which is stationary and possesses an equivalent focal length appropriate to give the complete objective the range of absolute focal lengths required, without altering the range of variation and with influencing the construction of the zooming system constituted by the first four members. Other ranges of absolute focal lengths may be obtained by substituting alternative rear members in a manner well understood in the art.

The front member, stationary with respect to zooming, is movable for focusing purposes independently of the zooming movements, in accordance with procedures also well known in the art.

The laws governing the displacements of the members movable for zooming require careful consideration. There are a great many possible combinations of focal lengths, magnifications and displacements of these members which will satisfy the relationships specified according to the invention, and two methods of developing optimized thin lens designs in accordance therewith will now be described.

PRODUCTION OF THIN LENS EMBODIMENTS

Thus, a thin lens embodiment of variable focal length objective in accordance with the invention will now be described by way of example with reference to the accompanying drawings, in which:

FIG. 1 is a diagrammatic representation of said objective with the movable members in the position of minimum equivalent focal length F0, and FIG. 2 is a similar representation with the members in the position of maximum equivalent focal length Fm.

Referring to these figures, the objective shown therein comprises a front assembly including the members movable for zooming under the control of a zoom control element, thereby to vary the focal length of the complete objective whilst keeping constant the position of the image plane P, and a rear assembly just in front of which is located an optical stop, or if desired an iris diaphragm, D.

The front assembly comprises a divergent front member 1 which is stationary with respect to zooming, followed by a convergent second member 2, a divergent third member 3 and a convergent fourth member 4. The second, third and fourth means are axially movable simultaneously for zooming, there members 2 and 4 moving forwardly equally at the same time as the member 3 moves rearwardly, as the equivalent focal length of the complete objective is increased. The law determining the movement of the third member 3 is clearly related to that governing the equal movements of the second and fourth members 2 and 4, in order to maintain constant the position of the image plane.

The rear assembly comprises a rear member 5, which is stationary and possesses an equivalent focal length appropriate to give the complete objective the range of absolute focal lengths required, without altering the range of variation and without influencing the construction of the zooming system constituted by the first four members. Other ranges of absolute focal lengths may be obtained by substituting alternative rear members in a manner well understood in the art.

The front member 1, stationary with respect to zooming, is movable for focusing purposes independently of the zooming movements, in accordance with procedures also well known in the art.

The laws governing the displacements of the movable members 2, 3 and 4 require careful consideration. There are a great many possible combinations of focal lengths, magnifications and displacements of these members which will satisfy the relationships specified according to the invention, and two methods of developing optimized thin lens designs in accordance therewith will now be described.

In the first method, arbitrary values for the focal lengths $f_2$ and $f_4$ of the members 2 and 4 are chosen within the specified ranges, and each member is considered in its two complementary positions, where the respective magnifications are $m_2$ and $m_4$ and then $1/m_2$ and $1/m_4$. The movements of these members 2 and 4 between these two positions will be equal to the distance between their conjugate distances and their conjugate points will be the same in both positions.

The focal lengths $f_2$ and $f_4$ could be made equal but this does not provide an optimum solution. On the other hand, equal movements for the members 2 and 4 are preferred (although not essential) and for this reason it is convenient to take unequal values for $m_2$ and $m_4$, within limits determined by the specified ranges for $g_2$ and $g_4$, which combine with unequal values of $f_2$ and $f_4$ to give such equal movements.

For example, bearing in mind the required $f$-number and equivalent focal length (Fo or Fm) required for the objective, suppose the focal length $f_2$ of the second member 2 is selected as exactly 2 whilst the focal length $f_4$ of the fourth member 4 is selected within the specified range as 1 1/9. Then if $m_2 = 1\frac{1}{2}$ and $m_4 = 2$, the conjugate distances for the second member 2 are $f_2(m_2 + 1)$ and $f_2(m_2 + 1)/m_2$, that is 5 and 3⅓, and the movement for the second member is 1⅔. Also, the conjugate distances for the fourth member 4 are $f_4(m_4 + 1)$ and $f_4(m_4 + 1)/m_4$, that is 3⅓ and 1⅔, and the movement for the fourth member is 1⅔.

The laws governing the movement of the third member 3 and the choice of $f_3$ are then set by the positions of the rear conjugate point of the second member 2 and the front conjugate point of the fourth member 4. The thin lens separation between the members 2 and 4 must be chosen so that the separation between these conjugate points is equal to $4f_3$ at one point in the range of relative movement and nowhere less than $4f_3$.

The separation between these conjugate points is the track length T over which the third member 3 must work, that is its object to image dimension. Its two conjugate distances are given by the expression:

$$(T - \sqrt{T^2 - 4Tf_3})/2.$$

Since the front conjugate point of the second member 2 is fixed, a value for $f_1$ greater than $f_2$ can be chosen so that the focal point of the front member 1 coincides with the fixed front conjugate point of the second member 2, thus fulfilling the requirement that the front member is stationary for zoom.

In this way it is possible to achieve a layout for the front assembly permitting an extremely wide range of variation of focal length to be achieved and offering a scope for design in accordance with the various specified relationships according to the invention not directly or inherently referred to above, which results in minimum diameters for the members 1 to 4 and minimum separations between the members which are large enough to cater for the required movements in a thick lens design.

Subsequently, the focal length $f_5$ of the rear member 5 is chosen to give the range of absolute equivalent focal lengths required. This rear member 5 can also be chosen to achieve a particular relative aperture (for the complete objective) for certain applications, and in this case the range of absolute focal lengths required can be obtained by appropriate scaling of the complete objective.

In a second method of developing a thin lens design, a point is chosen to work from in the range of relative movement at which the second, third and fourth members simultaneously work at unit magnification. Selection of focal lengths for these members within the specified ranges then immediately establishes their separations at this single point in the range. It is then possible to work outwardly from this point towards the two extremities of the range Fo and Fm, solving the quadratic equation involving the track length T of the third member 3 point by point until the required overall range is obtained. The members 1 and 5 are dealt with in the same manner as in the first method, whilst the requirements for minimum separations between the members is dealt with by adjustment of the values chosen for $f_2$, $f_3$ and $f_4$.

A numerical example of thin lens construction conforming to the invention and to be developed by the above-described methods will now be indicated by way of further illustration.

In this example, $f_1$ is −133, $f_2$ is 96.14, $f_3$ is −46.03 and $f_4$ is 76.94, whilst the rear member 5 is divergent but on a thin lens basis has a very large focal length taken as ∞; these values being taken to achieve a zoom ratio of 30 to 310, a relative aperture for the complete objective of f/1.4, and an image diameter of 40. The ratio $g_2$ between maximum and minimum magnifications of the second member 2 is thus 1.63, whilst the corresponding ratios $g_3$ and $g_4$ for the third and fourth members 3 and 4 are respectively 3.12 and 2.03. The ratio R of maximum to minimum equivalent focal length of the complete objective is 10.35, whilst the sum x of the distance between the rear nodal point of the second member 1 and the front nodal point of the third member 3 and the distance between the rear nodal point of the third member 3 and the front nodal point of the fourth member 4 is 149.98.

The movements of the zooming members 2, 3 and 4 are defined by the following extreme values, where $S_{T1}$, $S_{T2}$, $S_{T3}$ and $S_{T4}$ are the respective separations between the successive members of the objective, working from the front to the rear:

| Separation | Fo | Fm |
|---|---|---|
| $S_{T1}$ | 98.55 | 46.09 |
| $S_{T2}$ | 24.87 | 130.92 |
| $S_{T3}$ | 125.11 | 19.06 |
| $S_{T4}$ | 9.0 | 61.46 |

The stop D is assumed to be coincident with the rear member 5.

The values of the separations $S_{T1}$ to $S_{T4}$ intermediate the two end positions corresponding to Fo and Fm can readily be calculated by the methods previously described.

It can readily be ascertained by simple arithmetic that the numerical example given above is an optimized thin lens design conforming to the specified relationships essential to the invention. It therefore follows, from the previous explanation of these relationships, that a practical objective can be developed, on the basis of the above thin lens design, which achieves the required wide specification of wide angular field of view, wide range of variation of equivalent focal length with relatively simple relative movements, and capability of focusing down to close objects.

FURTHER FEATURES OF THE INVENTION

Having developed an optimized thin lens construction in the above described manner, utilizing the specified relationships governing selection of the thin lens parameters, the production of a practical fully corrected thick lens embodiment can be reduced to routine by the use of known programming techniques for advanced computers. However, in developing our own practical examples, we have uncovered features involving preferred structural forms for the members of the front assembly and involving preferred relationships for the thick lens parameters of these structural forms, which if followed, either wholly or in part, will reduce the work and calculation involved in the production of practical examples. These features emerge primarily in connection with the requirement to stabilize the aberrations in the zooming system constituted by the front assembly (the first to fourth members) and to control the stabilized aberrations so that these can be corrected in the rear assembly (the one or more stationary rear members).

In this respect, the precise construction of the front member is relatively unimportant, since it is designed in particular to ensure aberration stability during its focusing movement, which forms no part of the present invention.

Thus, assistance in achieving stabilization of aberrations during zooming may be gained by utilizing any one or more of the following further features:

1. The second, third and fourth members each comprise at least two components of which at least one is a compound component, said components being convergent in the second and fourth members and divergent in the third member, two components in the third member having an axial separation lying between $0.5f_3$ and $1.5f_3$. Preferably, the third member comprises a compound component spaced to the rear of a simple component by an amount lying between $0.7f_3$ and $1.4f_3$;

2. In the second member, the average value of the Abbe V numbers of the materials forming all the collective elements being at least twice the average value of the Abbe V numbers of the materials forming all the dispersive elements and preferably the former value lies between 2.2 and 2.5 times the latter value, whilst the average value of the mean refractive indices of the materials of all the dispersive elements exceeds the average value of the mean refractive indices of the materials of all the collective elements by an amount lying between 0.1 and 0.3 and preferably between 0.15 and 0.25;

3. The second member comprises a front doublet component followed by two further components at least one of which is compound, the radius of curvature of the internal contact of the front doublet component being less than $4f_2$ and preferably lying between $2.2f_2$ and $3.0f_2$, whilst the rear surfaces of the front two components of said member are both concave to the front, the rear surface of the second component having a radius less than $6f_2$ and preferably lying between $2.5f_2$ and $6f_2$, greater than the radius of the rear surface of the front component, which is greater than $f_2$ and preferably lies between $1.2f_2$ and $2.4f_2$, and the radius of the rear surface of the second member has a radius exceeding $4f_2$ and preferably less than $20f_2$;

4. The third member includes a compound component having a collective internal contact surface with a radius of curvature lying between $0.8f_3$ and $3f_3$ and preferably between $1.1f_3$ and $2.6f_3$, said component comprising at least one collective element and at least one dispersive element, the average value of the Abbe V numbers of the materials of the dispersive element(s) exceeding the average value of the Abbe V numbers of the materials of the collective element(s) by an amount lying between 15 and 30, and the average value of the refractive indices of the materials of the collective element(s) exceeding the average value of the refractive indices of the materials of the dispersive element(s) by an amount lying between 0.005 and 0.15;

5. The fourth member includes a compound component which is a doublet component having an internal contact convex to the front with radius lying between $0.7f_4$ and $1.7f_4$, preferably between $0.9f_4$ and $1.4f_4$, the two elements of said component being made of materials whose mean refractive indices differ by between 0.1 and 0.3, while the average value of the Abbe V numbers of the materials of all the collective element(s) of the fourth member exceeds the average value of the Abbe V numbers of the materials of all the dispersive element(s) by at least 20 and preferably by an amount lying between 30 and 37;

6. The fourth member comprises a compound component followed by a simple component, the front and rear surfaces of the compound component respectively having radii of curvature lying between $1.5f_4$ and $15f_4$, preferably $1.9f_4$ and $11.3f_4$, and between $0.7f_4$ and $5f_4$, preferably $0.9f_4$ and $2.3f_4$, and the front and rear surfaces of the simple component respectively having radii of curvature lying between $f_4$ and $3f_4$, preferably $1.4f_4$ and $2.3f_4$, and between $1.3f_4$ and $10f_4$, preferably $1.8f_4$ and $4.2f_4$.

It should be made clear that, where reference is made above to the "internal contact" of a compound component, this is intended to include not only a cemented contact surface but also a "broken contact" wherein the contact surfaces have slightly differing radii and the effective radius of the internal contact is constituted by the arithmetic mean of said slightly differing radii.

In connection with the above-described features of the second, third and fourth members of the objective, it should be explained that the use of a second compound component in the second member (the first two practical examples to be later described use only one compound component) materially assists in the achievement of a high standard of aberration stabilization, especially in respect of chromatic aberrations. Thus, in these two compound components and the usually provided rear simple component of the second member, the choice of materials is important, in respect of both Abbe V numbers and mean refractive indices, more especially as far as stabilization of spherical aberration and chromatic aberrations, respectively, is concerned. Not only the absolute values of the radii of curvature of the internal contacts of these compound components, but also the relationship between said radii, is important for stabilization of spherical aberration and distortion correction. For the same reason, the relationship between the radii of curvature of the rear surfaces of these two compound components, as well as the absolute values of said radii, is also important.

Similar considerations apply in respect of the design of the third member, as far as the construction of the compound component and the choice of glasses are concerned, taking into account the specified axial separation between the compound and simple components in this member. In the latter connection, it should be explained that the stabilization and correction of coma can prove especially difficult to achieve and that a minimum separation of $0.5f_3$, preferably $0.7f_3$, between two components of the third member minimizes this problem, even though such a separation is not necessary or even desirable for purely mechanical considerations. However, if this separation is taken beyond $1.4f_3$, or at most $1.5f_3$, the disadvantage of increased overall objective length begins to outweigh the optical advantage gained.

By virtue of the improved design of the second and third members, in practical examples later than the first two to be described, the fourth member is partially relieved of responsibility for stabilization of coma during zooming, whereby in the later examples the construction of the fourth member is somewhat simplified. However, the choice of materials in this member, and in particular the construction of the compound component, is of importance in the control of chromatic aberrations.

It should be mentioned, however, that a parameter which contributes strongly towards the stabilization and control of one type of aberration at one point in the range may at a different point contribute in a different manner, for example to control a different type of aberration. It must therefore be recognized that the functions above-mentioned for the features involving the various parameters of the second, third and fourth members are the primary functions for which these features are intended and that in addition they may contribute usefully, especially in cooperation with other features, towards different functions.

DESCRIPTION OF EMBODIMENTS

Numerical data for eleven practical examples of optical objective in accordance with the invention are given in the following tables, in which $R_1$ and $R_2$ .... designate the radii of curvature of the individual surfaces counting from the front, the positive sign indicating that the surface is convex to the front and the negative sign that it is concave thereto; $D_1 D_2$ .... designate the axial thicknesses of the individual elements; and $S_1 S_2$ .... designate the axial air separations between the components of each objective. The tables also give the mean refractive indices $n$ for the $d$ line of the spectrum and the Abbe V numbers of the materials of which the various elements of the objectives are made, and in addition the clear diameters of the various surfaces.

Since each zoom lens includes three movable members in the front assembly, four variable air separations are involved; these are specified in the second section of each table. The values of the variable air separations are given, assuming the objective to be focused for infinity (since focusing movement of the front member affects the first of such variable air separations), for a number of zooming positions designated in terms of the equivalent focal length F of the complete objective as this varies from the minimum value $Fo$ to the maximum value $Fm$.

For the first two examples, the third section of the table gives the equation defining an axial section through an aspheric surface provided in the stationary rear member of the objective.

Figure 1:
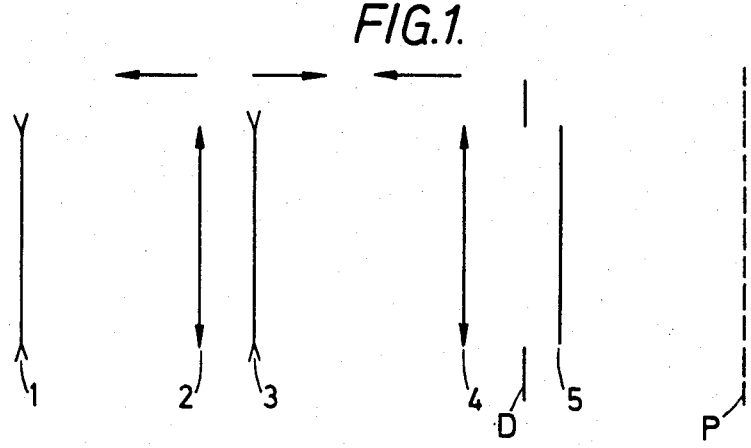
Figure 2:
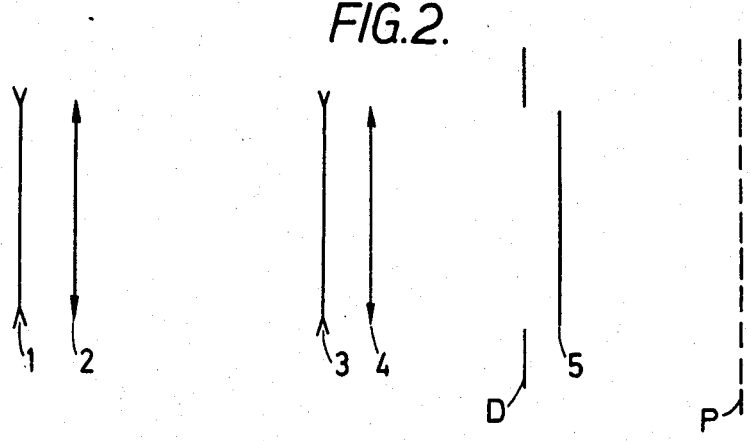
Figure 3:
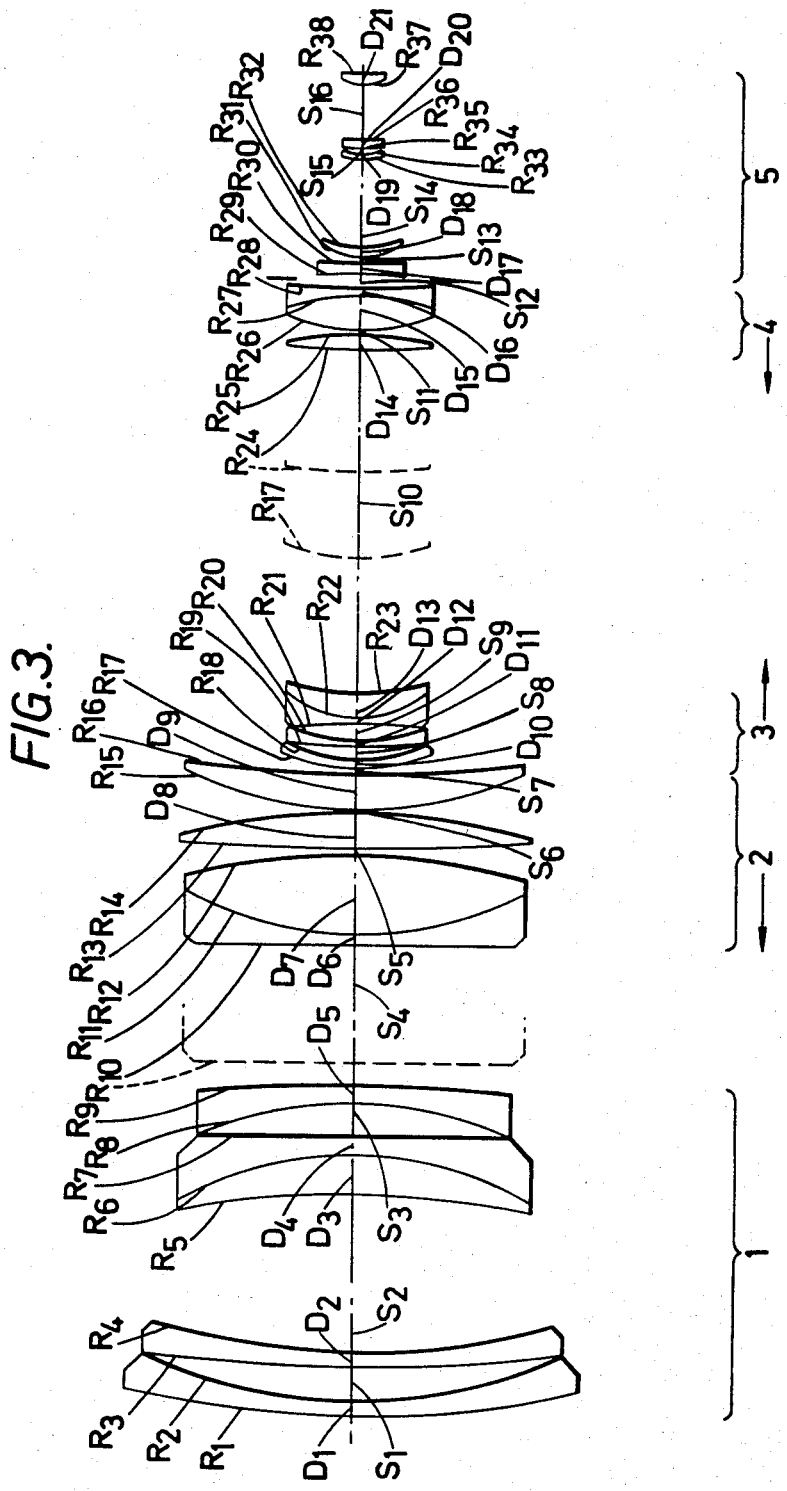
Figure 4:
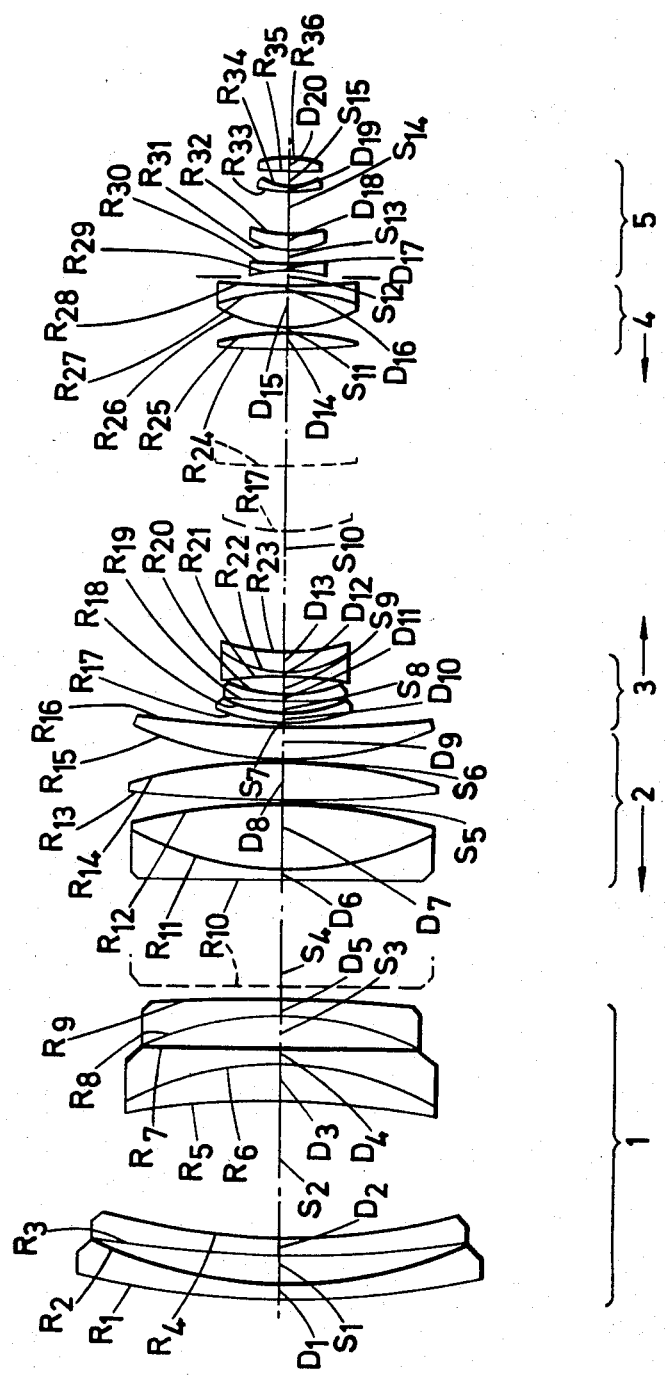
Figure 5:
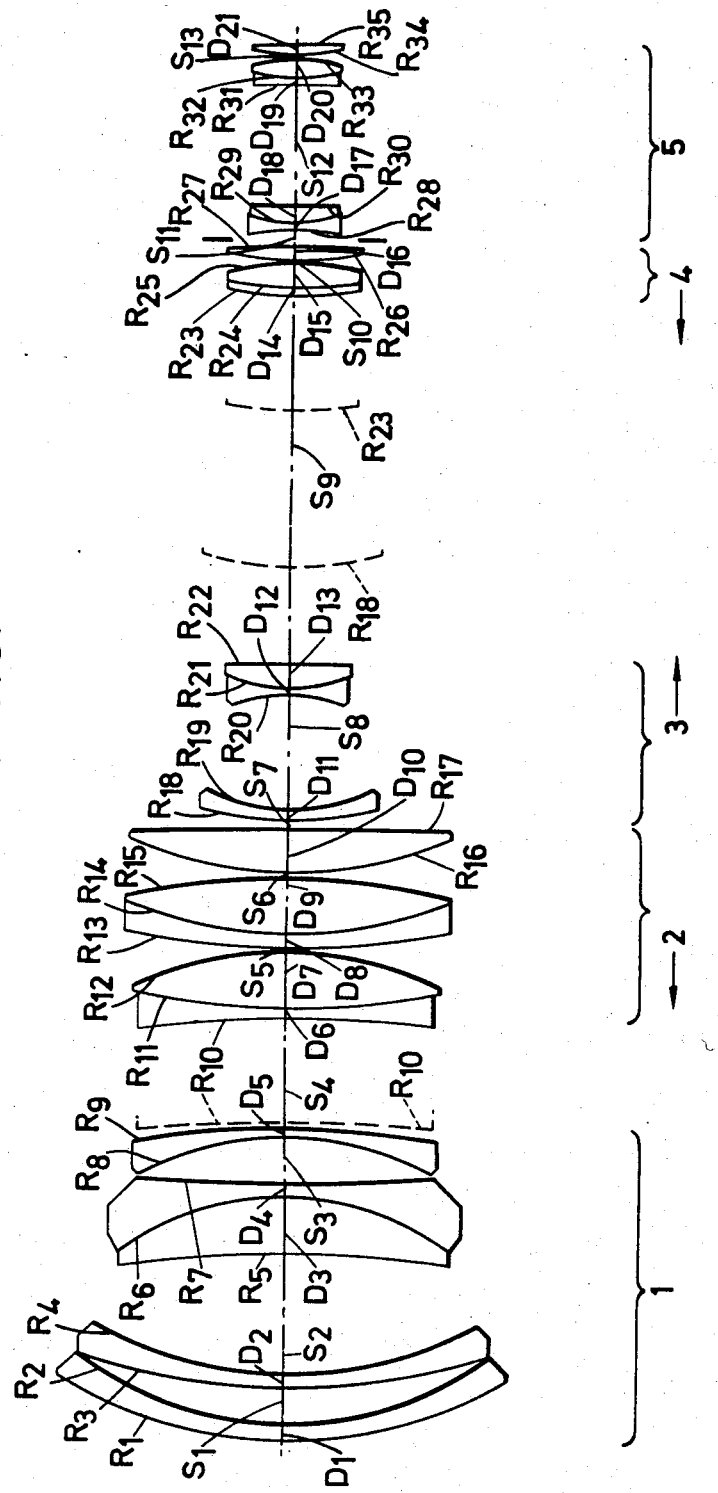
Figure 6:
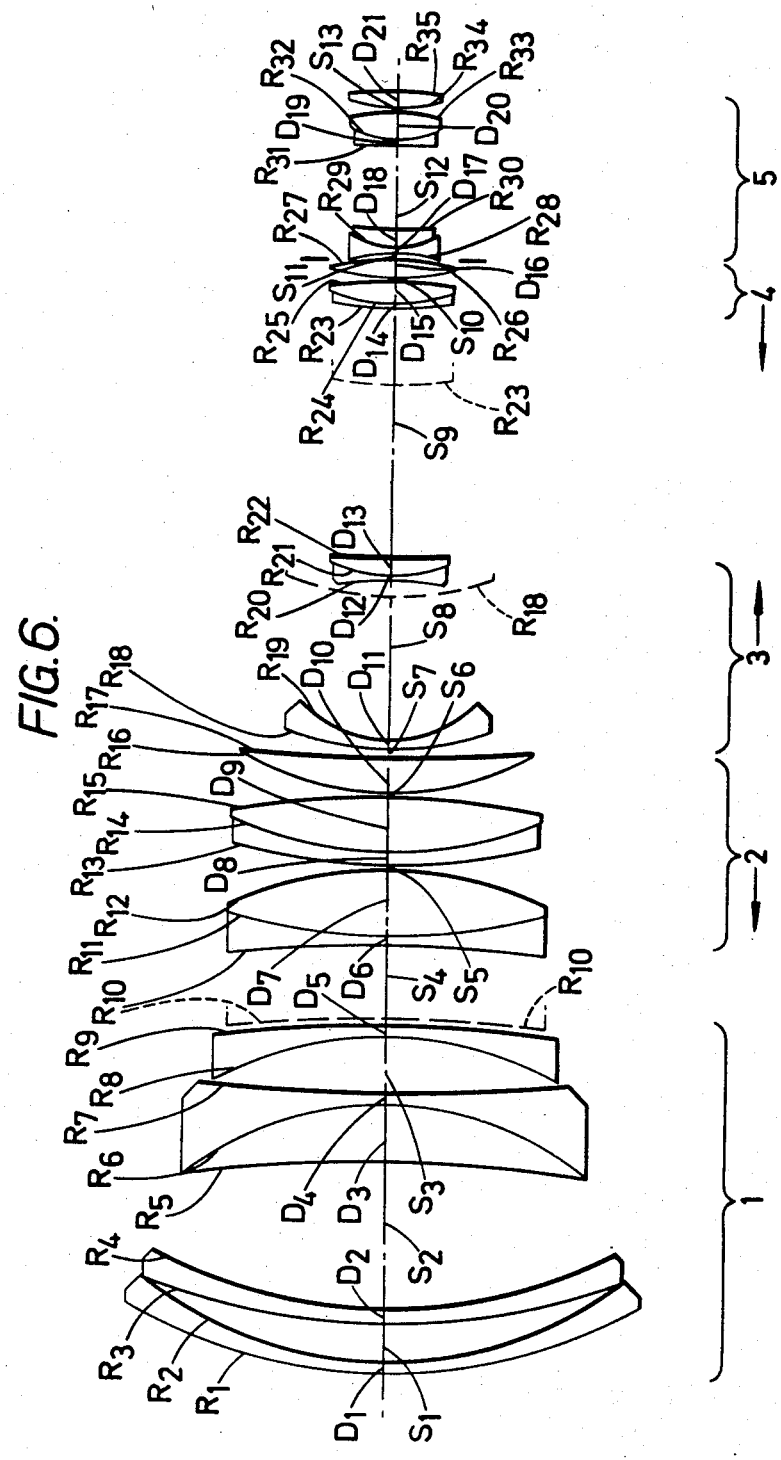
Figure 7:
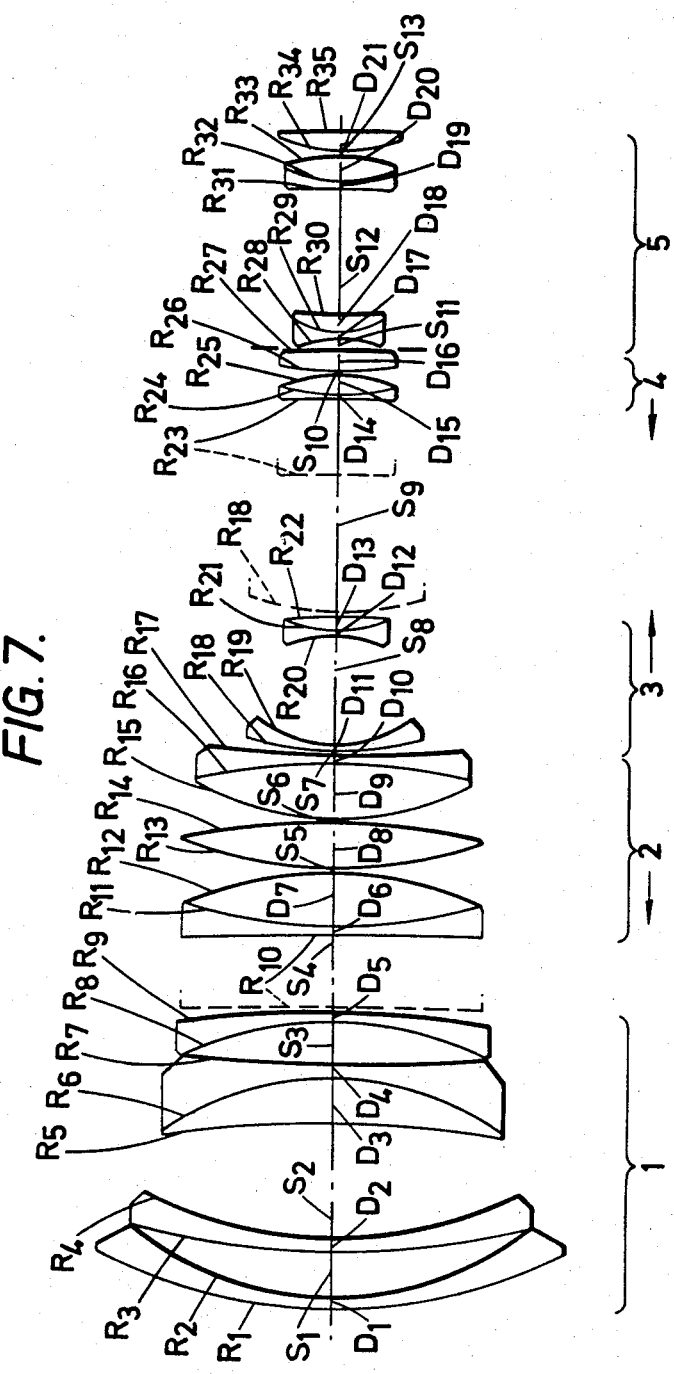
Figure 8:
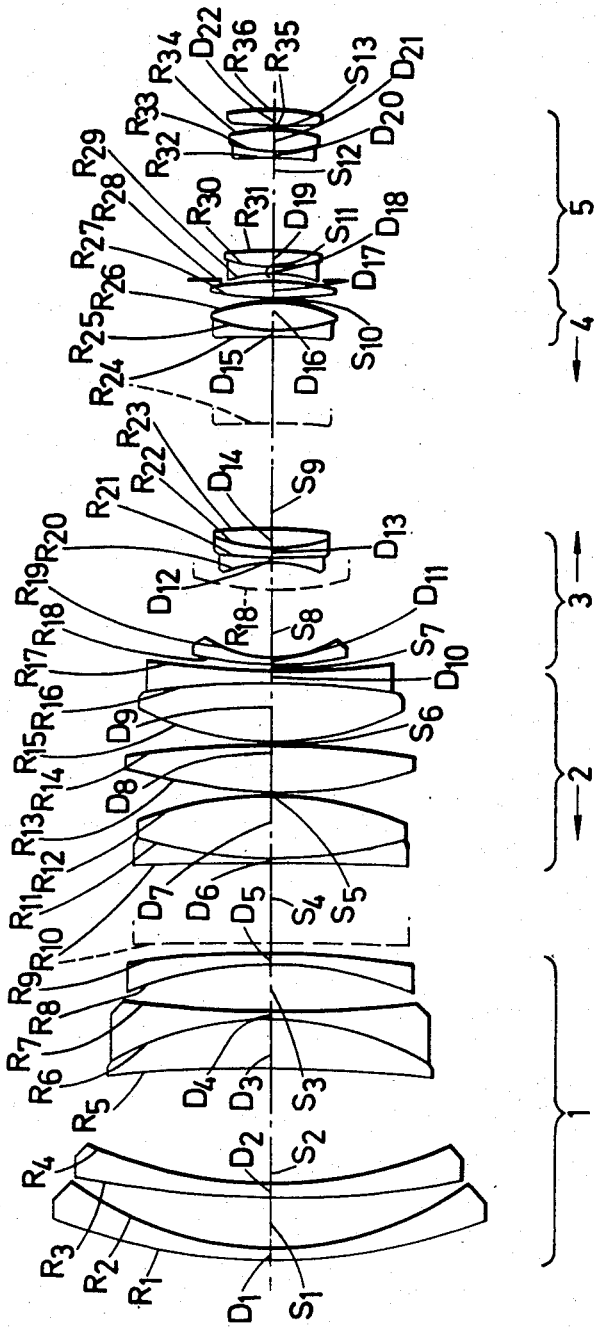
Figure 9:
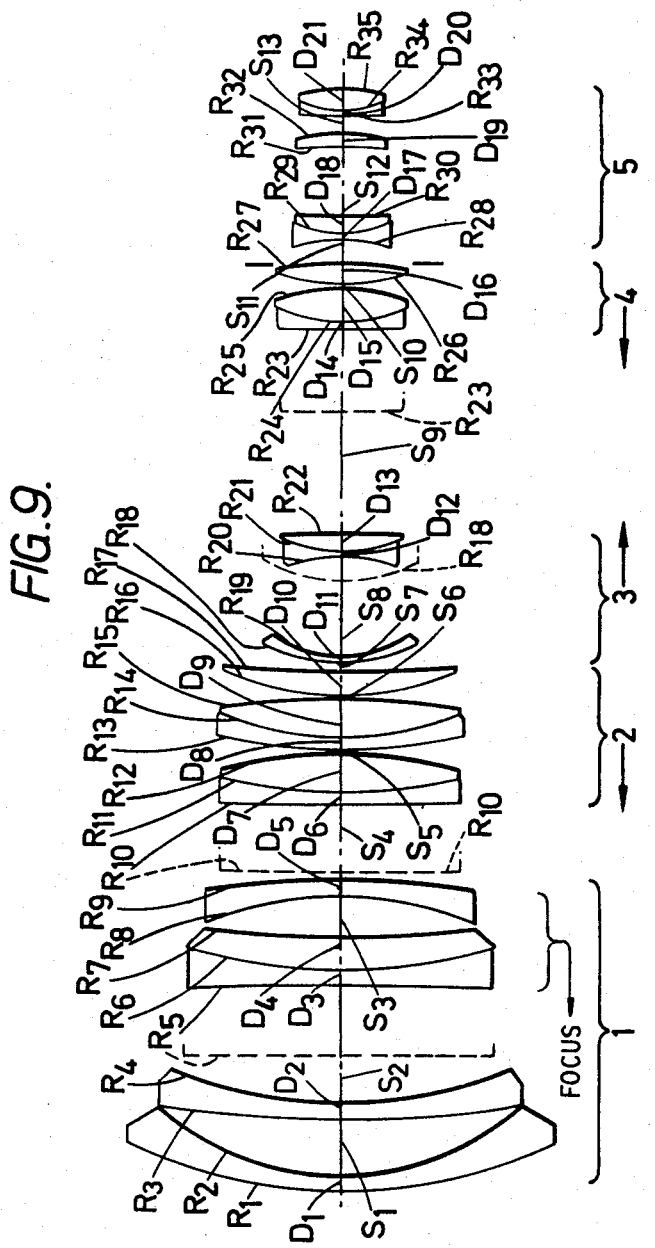

The examples are illustrated, in each case with their movable members in the position of minimum focal length $Fo$, in the accompanying drawings, wherein:

FIG. 3 relates to the first practical example;
FIG. 4 to the second;
FIG. 5 to the third, fourth and fifth;
FIG. 6 to the sixth, ninth and tenth;
FIG. 7 to the seventh;
FIG. 8 to the eighth; and
FIG. 9 to the eleventh example.

Although each example of each of the groups constituted by the third to fifth examples, and the sixth ninth, and tenth examples constitutes a substantially independent design, the numbers of elements and parameters involved are similar, and the differences in the values of said parameters, from one example to the other within each group, does not materially affect the appearance of the objective of the scale to which it is drawn.

Example 1 — Table 1 — Fo = 1.0

| Radius | Thickness or Air Separation | | Refractive Index $n_d$ | Abbe V Number | Clear Diameter |
|---|---|---|---|---|---|
| $R_1$ +23.333 | | | | | 10.400 |
| | $D_1$ | 0.333 | 1.64050 | 60.10 | |
| $R_2$ +12.000 | | | | | 9.667 |
| | $S_1$ | 0.720 | | | |
| $R_3$ +33.333 | | | | | 9.613 |
| | $D_2$ | 0.333 | 1.64050 | 60.10 | |
| $R_4$ +17.133 | | | | | 9.180 |
| | $S_2$ | 3.467 | | | |
| $R_5$ −20.667 | | | | | 8.000 |
| | $D_3$ | 0.867 | 1.80518 | 25.43 | |
| $R_6$ −8.333 | | | | | 7.933 |
| $R_7$ ∞ | | | | | 7.307 |
| $R_8$ −9.200 | | | | | 7.233 |
| $R_9$ −72.788 | | | | | 7.773 |
| $R_{10}$ ∞ | | | | | 7.333 |
| $R_{11}$ +8.667 | | | | | 7.700 |
| $R_{12}$ −14.667 | | | | | 7.800 |
| $R_{13}$ +46.133 | | | | | 8.000 |
| $R_{14}$ −14.533 | | | | | 8.000 |
| $R_{15}$ +10.000 | | | | | 7.800 |
| $R_{16}$ +33.681 | | | | | 7.733 |
| $R_{17}$ +5.180 | | | | | 3.367 |
| $R_{18}$ +3.100 | | | | | 3.167 |
| $R_{19}$ +10.413 | | | | | 3.167 |
| $R_{20}$ +3.933 | | | | | 3.100 |
| $R_{21}$ −19.160 | | | | | 3.133 |
| $R_{22}$ +2.493 | | | | | 3.233 |
| $R_{23}$ +5.026 | | | | | 3.233 |
| $R_{24}$ +23.733 | | | | | 3.267 |
| $R_{25}$ −7.193 | | | | | 3.300 |
| $R_{26}$ +3.907 | | | | | 3.300 |
| $R_{27}$ −4.667 | | | | | 3.300 |
| $R_{28}$ +17.719 | | | | | 3.133 |
| $R_{29}$ −13.811 (ASPHERIC) | | | | | 2.0067 |
| $R_{30}$ +46.1361 | | | | | 1.9607 |
| $R_{31}$ +1.5005 | | | | | 1.8487 |
| $R_{32}$ +1.6853 | | | | | 1.7667 |
| $R_{33}$ +2.4208 | | | | | 1.3264 |
| $R_{34}$ +1.2148 | | | | | 1.2874 |
| $R_{35}$ +2.0232 | | | | | 1.2992 |
| $R_{36}$ +67.4082 | | | | | 1.3250 |
| $R_{37}$ +1.2707 | | | | | 1.7440 |
| $R_{38}$ +5.3731 | | | | | 1.6841 |

| | | | | |
|---|---|---|---|---|
| | $D_4$ | 0.333 | 1.58904 | 53.01 |
| | $S_3$ | 0.820 | | |
| | $D_5$ | 0.333 | 1.46450 | 65.77 |
| | $S_4$ | variable | | |
| | $D_6$ | 0.267 | 1.80518 | 25.43 |
| | $D_7$ | 7.733 | 1.69680 | 56.18 |
| | $S_5$ | 0.00667 | | |
| | $D_8$ | 0.900 | 1.69680 | 56.18 |
| | $S_6$ | 0.00667 | | |
| | $D_9$ | 0.733 | 1.64050 | 60.10 |
| | $S_7$ | variable | | |
| | $D_{10}$ | 0.133 | 1.72000 | 50.41 |
| | $S_8$ | 0.320 | | |
| | $D_{11}$ | 0.133 | 1.71000 | 50.41 |
| | $S_9$ | 0.400 | | |
| | $D_{12}$ | 0.100 | 1.56873 | 63.08 |
| | $D_{13}$ | 0.500 | 1.80518 | 25.43 |
| | $S_{10}$ | variable | | |
| | $D_{14}$ | 0.400 | 1.68900 | 49.48 |
| | $S_{11}$ | 0.00667 | | |
| | $D_{15}$ | 0.800 | 1.69680 | 56.18 |
| | $D_{16}$ | 0.133 | 1.80518 | 25.43 |
| | $S_{12}$ | variable | | |
| | $D_{17}$ | 0.2370 | 1.69680 | 56.18 |
| | $S_{13}$ | 0.1351 | | |
| | $D_{18}$ | 0.1952 | 1.50137 | 56.41 |
| | $S_{14}$ | 1.9911 | | |
| | $D_{19}$ | 0.1311 | 1.69680 | 56.18 |
| | $S_{15}$ | 0.0953 | | |
| | $D_{20}$ | 0.2469 | 1.48606 | 81.49 |
| | $S_{16}$ | 1.1463 | | |
| | $D_{21}$ | 0.4241 | 1.48606 | 81.49 |

Thick Lens Separations

| F | $S_4$ | $S_7$ | $S_{10}$ | $S_{12}$ |
|---|---|---|---|---|
| 1.000 | 3.0896 | 0.0706 | 7.6576 | 0.2755 |
| 1.525 | 1.7078 | 1.7290 | 5.9992 | 0.6573 |
| 3.075 | 1.9574 | 4.0622 | 3.6658 | 1.4075 |
| 3.588 | 1.7736 | 4.5290 | 3.1992 | 1.5915 |
| 5.952 | 1.1290 | 5.9956 | 1.7324 | 2.2359 |
| 8.070 | 0.7182 | 6.8624 | 0.8658 | 2.6469 |
| 10.000 | 0.4182 | 7.4780 | 0.2500 | 2.9467 |

Equation for aspheric surface $R_{29}$:
$$x = -13.811 + \sqrt{190.743721 - y^2} + A_2 y^2 + A_4 y^4 + A_6 y^6 + A_8 y^8 + A_{10} y^{10}$$
where
$A_2 = 0.3989925 \times 10^{-2}$
$A_4 = -0.42625912 \times 10^{-3}$
$A_6 = -0.63682097 \times 10^{-3}$
$A_8 = -0.14074694 \times 10^{-2}$
$A_{10} = 0.11075916 \times 10^{-2}$ Example 2 — Table 2 — Fo = 1

| Radius | Thickness or | Refractive | Abbe V | Clear |

| | Air Separation | Index $n_d$ | Number |
|---|---|---|---|
| $R_1$ +11.667 | | | |
| | $D_1$ 0.167 | 1.64050 | 60.10 |
| $R_2$ +6.000 | | | |
| | $S_1$ 0.360 | | |
| $R_3$ +16.667 | | | |
| | $D_2$ 0.167 | 1.64060 | 60.10 |
| $R_4$ +8.567 | | | |
| | $S_2$ 1.733 | | |
| $R_5$ −10.333 | | | |
| | $D_3$ 0.433 | 1.80518 | 25.43 |
| $R_6$ −4.167 | | | |
| | $D_4$ 0.167 | 1.58904 | 53.01 |
| $R_7$ ∞ | | | |
| | $S_3$ 0.410 | | |
| $R_8$ −4.600 | | | |
| | $D_5$ 0.167 | 1.46450 | 65.77 |
| $R_9$ −36.394 | | | |
| | $S_4$ variable | | |
| $R_{10}$ ∞ | | | |
| | $D_6$ 0.133 | 1.80518 | 25.43 |
| $R_{11}$ +3.983 | | | |
| | $D_7$ 0.867 | 1.69680 | 56.18 |
| $R_{12}$ −7.657 | | | |
| | $S_5$ 0.00333 | | |
| $R_{13}$ +17.667 | | | |
| | $D_8$ 0.533 | 1.58904 | 53.01 |
| $R_{14}$ −6.400 | | | |
| | $S_6$ 0.00333 | | |
| $R_{15}$ +5.000 | | | |
| | $D_9$ 0.367 | 1.64050 | 60.10 |
| $R_{16}$ +21.703 | | | |
| | $S_7$ variable | | |
| $R_{17}$ +2.590 | | | |
| | $D_{10}$ 0.0667 | 1.72000 | 50.41 |
| $R_{18}$ +1.550 | | | |
| | $S_8$ 0.160 | | |
| $R_{19}$ +5.207 | | | |
| | $D_{11}$ 0.0667 | 1.71000 | 50.41 |
| $R_{20}$ +1.967 | | | |
| | $S_9$ 0.200 | | |
| $R_{21}$ −9.580 | | | |
| | $D_{12}$ 0.050 | 1.56873 | 63.08 |
| $R_{22}$ +1.247 | | | |
| | $D_{13}$ 0.250 | 1.80518 | 25.43 |
| $R_{23}$ +2.513 | | | |
| | $S_{10}$ variable | | |
| $R_{24}$ +11.867 | | | |
| | $D_{14}$ 0.200 | 1.68900 | 49.48 |
| $R_{25}$ −3.597 | | | |
| | $S_{11}$ 0.00333 | | |
| $R_{26}$ +1.953 | | | |
| | $D_{15}$ 0.400 | 1.69680 | 56.18 |
| $R_{27}$ −2.333 | | | |
| | $D_{16}$ 0.0667 | 1.80518 | 25.43 |
| $R_{28}$ +8.860 | | | |
| | $S_{12}$ variable | | |
| $R_{29}$ −3.897 (ASPHERIC) | | | |
| | $D_{17}$ 0.125 | 1.69680 | 56.18 |
| $R_{30}$ +4.156 | | | |
| | $S_{13}$ 0.1571 | | |
| $R_{31}$ +0.8569 | | | |
| | $D_{18}$ 0.198 | 1.50137 | 56.41 |
| $R_{32}$ +1.3675 | | | |
| | $S_{14}$ 0.5166 | | |
| $R_{33}$ +1.7292 | | | |
| | $D_{19}$ 0.0659 | 1.69680 | 56.18 |
| $R_{34}$ +0.7778 | | | |
| | $S_{15}$ 0.1886 | | |
| $R_{35}$ +3.8356 | | | |
| | $D_{20}$ 0.1397 | 1.50137 | 56.41 |
| $R_{36}$ −1.6835 | | | |

Thick Lens Separations

| F | $S_4$ | $S_7$ | $S_{10}$ | $S_{12}$ |
|---|---|---|---|---|
| 1.000 | 1.4847 | 0.0244 | 3.8287 | 0.1377 |
| 1.525 | 1.2938 | 0.8536 | 2.9996 | 0.3286 |
| 3.075 | 0.9186 | 2.0202 | 1.8329 | 0.7037 |
| 3.588 | 0.8267 | 2.2536 | 1.5996 | 0.7957 |
| 5.952 | 0.5044 | 2.9869 | 0.8662 | 1.1179 |
| 8.070 | 0.2990 | 3.4203 | 0.4329 | 1.3234 |
| 10.000 | 0.1490 | 3.7281 | 0.1250 | 1.4733 |

Equation for aspheric surface $R_{29}$:
$$x = -3.897 + \sqrt{15.186609 - y^2} + A_2 y^2 + A_4 y^4 + A_6 y^6 + A_8 y^8 + A_{10} y^{10}$$
where
$A_2 = -0.13871131 \times 10^{-2}$
$A_4 = -0.27256508 \times 10^{-2}$
$A_6 = -0.27346482$
$A_8 = -0.22625624$
$A_{10} = 0.58752824$

Example 3 — Table 3 — Fo = 1

| Radius | Thickness or Air Separation | Refractive Index $n_d$ | Abbe V Number | Clear Diameter |
|---|---|---|---|---|
| $R_1$ +10.712 | | | | 10.400 |
| | $D_1$ 0.312 | 1.68900 | 49.50 | |
| | $S_1$ 0.769 | | | 9.631 |
| $R_2$ +13.500 | | | | 9.606 |
| | $D_2$ 0.313 | 1.68900 | 49.50 | |
| $R_4$ +9.319 | | | | 9.025 |
| | $S_2$ 2.787 | | | |
| $R_5$ −26.187 | | | | 8.125 |
| | $D_3$ 1.200 | 1.80518 | 25.43 | |
| $R_6$ −6.619 | | | | 8.125 |
| | $D_4$ 0.312 | 1.62041 | 60.33 | |
| $R_7$ +39.431 | | | | 7.000 |
| | $S_3$ 1.075 | | | |
| $R_8$ −7.212 | | | | 6.975 |
| | $D_5$ 0.250 | 1.72000 | 50.41 | |
| $R_9$ −21.106 | | | | 7.019 |
| | $S_4$ variable | | | |
| $R_{10}$ −34.669 | | | | 6.881 |
| | $D_6$ 0.250 | 1.80518 | 25.43 | |
| $R_{11}$ +18.819 | | | | 7.087 |
| | $D_7$ 1.212 | 1.55963 | 61.21 | |
| $R_{12}$ −8.694 | | | | 7.175 |
| | $S_5$ 0.006 | | | |
| $R_{13}$ +21.356 | | | | 7.500 |
| | $D_8$ 0.250 | 1.80518 | 25.43 | |
| $R_{14}$ +10.006 | | | | 7.506 |
| | $D_9$ 1.331 | 1.62041 | 60.33 | |
| $R_{15}$ −16.069 | | | | 7.525 |
| | $S_6$ 0.006 | | | |
| $R_{16}$ +9.756 | | | | 7.493 |
| | $D_{10}$ 1.019 | 1.64050 | 60.10 | |
| $R_{17}$ −85.937 | | | | 7.437 |
| | $S_7$ variable | | | |
| $R_{18}$ +9.544 | | | | 4.187 |
| | $D_{11}$ 0.125 | 1.73350 | 51.65 | |
| $R_{19}$ +3.456 | | | | 3.769 |
| | $S_8$ 2.488 | | | |
| $R_{20}$ −4.331 | | | | 2.788 |
| | $D_{12}$ 0.125 | 1.73350 | 51.65 | |
| $R_{21}$ +3.956 | | | | 2.962 |
| | $D_{13}$ 0.481 | 1.76180 | 26.95 | |
| $R_{22}$ −33.401 | | | | 2.988 |
| | $S_9$ variable | | | |
| $R_{23}$ +13.144 | | | | 3.094 |
| | $D_{14}$ 0.125 | 1.80518 | 25.43 | |
| $R_{24}$ +6.075 | | | | 3.112 |
| | $D_{15}$ 0.562 | 1.53996 | 59.71 | |
| $R_{25}$ −6.150 | | | | 3.137 |
| | $S_{10}$ 0.006 | | | |
| $R_{26}$ +7.219 | | | | 3.137 |
| | $D_{16}$ 0.388 | 1.55232 | 63.46 | |
| $R_{27}$ −19.887 | | | | 3.137 |
| | $S_{11}$ variable | | | |
| $R_{28}$ −4.687 | | | | 2.217 |
| | $D_{17}$ 0.125 | 1.62606 | 38.96 | |
| $R_{29}$ +2.459 | | | | 2.212 |
| | $D_{18}$ 0.344 | 1.78470 | 26.08 | |
| $R_{30}$ +22.385 | | | | 2.200 |
| | $S_{12}$ 2.625 | | | |
| $R_{31}$ ∞ | | | | 1.944 |
| | $D_{19}$ 0.125 | 1.78470 | 26.08 | |
| $R_{32}$ +2.782 | | | | 1.979 |
| | $D_{20}$ 0.469 | 1.51742 | 52.20 | |
| $R_{33}$ −4.042 | | | | 2.025 |
| | $S_{13}$ 0.006 | | | |
| $R_{34}$ +3.938 | | | | 2.069 |
| | $D_{21}$ 0.281 | 1.51680 | 64.17 | |
| $R_{35}$ −16.392 | | | | 2.069 |

This objective is corrected for use with a prism of thickness 4.2 Fo in the rear conjugate, said prism having a refractive index of 1.5168 and an Abbe V number of 64.17.

Thick Lens Separations during Zooming with Object at Infinity

| F | $S_4$ | $S_7$ | $S_9$ | $S_{11}$ |
|---|---|---|---|---|
| 1.000 | 2.4405 | 0.1842 | 8.2807 | 0.3466 |
| 1.660 | 1.9793 | 2.2124 | 6.2526 | 0.8078 |
| 2.950 | 1.4027 | 4.2356 | 4.2293 | 1.3844 |

Diameter column (first table):
5.200, 4.833, 4.807, 4.590, 4.000, 3.967, 3.653, 3.617, 3.557, 3.667, 3.850, 3.900, 4.000, 4.000, 3.900, 3.867, 1.683, 1.583, 1.583, 1.550, 1.567, 1.617, 1.617, 1.633, 1.650, 1.650, 1.650, 1.567, 1.011, 0.991, 0.9893, 0.933, 0.776, 0.732, 0.742, 0.741

| 5.450 | 0.7424 | 6.2515 | 2.2134 | 2.0477 |
| 10.000 | 0.0692 | 8.2820 | 0.1829 | 2.7179 |

Example 4 — Table 4 — $F_o = 1$

| Radius | Thickness or Air Separation | Refractive Index $n_d$ | Abbe V Number | Clear Diameter |
|---|---|---|---|---|
| $R_1$ +11.200 | | | | 9.95 |
| | $D_1$ 0.305 | 1.61772 | 49.77 | |
| $R_2$ +7.671 | | | | 9.13 |
| | $S_1$ 0.769 | | | |
| $R_3$ +14.503 | | | | 9.13 |
| | $D_2$ 0.305 | 1.61772 | 49.77 | |
| $R_4$ +9.173 | | | | 8.54 |
| | $S_2$ 2.650 | | | |
| $R_5$ +23.480 | | | | 7.69 |
| | $D_3$ 1.080 | 1.80518 | 25.43 | |
| $R_6$ −6.395 | | | | 7.69 |
| | $D_4$ 0.305 | 1.62041 | 60.33 | |
| $R_7$ +41.650 | | | | 6.75 |
| | $S_3$ 1.012 | | | |
| $R_8$ −6.937 | | | | 6.75 |
| | $D_5$ 0.244 | 1.68900 | 49.60 | |
| $R_9$ −18.751 | | | | 6.88 |
| | $S_4$ variable | | | |
| $R_{10}$ −33.312 | | | | 6.18 |
| | $D_6$ 0.244 | 1.80518 | 25.43 | |
| $R_{11}$ +16.321 | | | | 6.49 |
| | $D_7$ 1.125 | 1.58900 | 61.27 | |
| $R_{12}$ −8.645 | | | | 6.58 |
| | $S_5$ 0.006 | | | |
| $R_{13}$ +21.566 | | | | 6.96 |
| | $D_8$ 0.244 | 1.80518 | 25.43 | |
| $R_{14}$ +10.416 | | | | 7.01 |
| | $D_9$ 1.144 | 1.62041 | 60.33 | |
| $R_{15}$ −16.429 | | | | 7.05 |
| | $S_6$ 0.006 | | | |
| $R_{16}$ +9.508 | | | | 7.14 |
| | $D_{10}$ 0.925 | 1.61270 | 58.63 | |
| $R_{17}$ −59.606 | | | | 7.11 |
| | $S_7$ variable | | | |
| $R_{18}$ +14.435 | | | | 4.01 |
| | $D_{11}$ 0.122 | 1.73350 | 51.65 | |
| $R_{19}$ +3.867 | | | | 3.65 |
| | $S_8$ 2.420 | | | |
| $R_{20}$ −4.657 | | | | 2.79 |
| | $D_{12}$ 0.122 | 1.73350 | 51.65 | |
| $R_{21}$ +3.309 | | | | 2.94 |
| | $D_{13}$ 0.486 | 1.74080 | 28.09 | |
| $R_{22}$ −54.934 | | | | 2.98 |
| | $S_9$ variable | | | |
| $R_{23}$ +16.620 | | | | 3.06 |
| | $D_{14}$ 0.122 | 1.80518 | 25.43 | |
| $R_{24}$ +5.424 | | | | 3.08 |
| | $D_{15}$ 0.542 | 1.51680 | 64.17 | |
| $R_{25}$ −6.115 | | | | 3.10 |
| | $S_{10}$ 0.006 | | | |
| $R_{26}$ +6.754 | | | | 3.12 |
| | $D_{16}$ 0.371 | 1.51454 | 54.70 | |
| $R_{27}$ −13.303 | | | | 3.12 |
| | $S_{11}$ variable | | | |
| $R_{28}$ −4.366 | | | | 2.19 |
| | $D_{17}$ 0.122 | 1.62606 | 38.96 | |
| $R_{29}$ +2.410 | | | | 2.19 |
| | $D_{18}$ 0.334 | 1.80518 | 25.43 | |
| $R_{30}$ +22.380 | | | | 2.18 |
| | $S_{12}$ 2.553 | | | |
| $R_{31}$ +68.262 | | | | 1.91 |
| | $D_{19}$ 0.122 | 1.80518 | 25.43 | |
| $R_{32}$ +2.800 | | | | 1.93 |
| | $D_{20}$ 0.456 | 1.52257 | 60.18 | |
| $R_{33}$ −3.942 | | | | 1.98 |
| | $S_{13}$ 0.006 | | | |
| $R_{34}$ +3.896 | | | | 2.02 |
| | $D_{21}$ 0.273 | 1.52257 | 60.18 | |
| $R_{35}$ −36.500 | | | | 2.01 |

This objective is corrected for use with a prism of thickness 4.2 $F_o$ in the rear conjugate, said prism having a refractive index of 1.5168 and an Abbe V number of 64.17.

Thick Lens Separations during Zooming with Object at Infinity

| F | $S_4$ | $S_7$ | $S_9$ | $S_{11}$ |
|---|---|---|---|---|
| 1.0000 | 2.6637 | 0.1997 | 7.9281 | 0.3880 |
| 1.660 | 2.1844 | 2.1391 | 5.9887 | 0.8673 |
| 2.950 | 1.5870 | 4.0795 | 4.0483 | 1.4647 |
| 5.450 | 0.9057 | 6.0202 | 2.1076 | 2.1460 |
| 10.000 | 0.2146 | 7.9832 | 0.1446 | 2.8371 |

Example 5 — Table 5 — $F_o = 1$

| Radius | Thickness or Air Separation | Refractive Index $n_d$ | Abbe V Number | Clear Diameter |
|---|---|---|---|---|
| $R_1$ +10.336 | | | | 8.78 |
| | $D_1$ 0.269 | 1.61772 | 49.77 | |
| $R_2$ +6.977 | | | | 8.16 |
| | $S_1$ 0.625 | | | |
| $R_3$ +12.372 | | | | 8.16 |
| | $D_2$ 0.269 | 1.61772 | 49.77 | |
| $R_4$ +7.951 | | | | 7.53 |
| | $S_2$ 2.338 | | | |
| $R_5$ −20.780 | | | | 6.80 |
| | $D_3$ 0.975 | 1.80518 | 25.43 | |
| $R_6$ −5.642 | | | | 6.76 |
| | $D_4$ 0.269 | 1.62041 | 60.33 | |
| $R_7$ +36.776 | | | | 5.96 |
| | $S_3$ 0.912 | | | |
| $R_8$ −6.035 | | | | 5.89 |
| | $D_5$ 0.215 | 1.68900 | 49.60 | |
| $R_9$ −16.074 | | | | 5.93 |
| | $S_4$ variable | | | |
| $R_{10}$ −27.200 | | | | 5.51 |
| | $D_6$ 0.215 | 1.80518 | 25.43 | |
| $R_{11}$ +15.389 | | | | 5.71 |
| | $D_7$ 1.012 | 1.58900 | 61.27 | |
| $R_{12}$ −7.480 | | | | 5.80 |
| | $S_5$ 0.006 | | | |
| $R_{13}$ +18.412 | | | | 6.13 |
| | $D_8$ 0.125 | 1.80518 | 25.43 | |
| $R_{14}$ +9.066 | | | | 6.16 |
| | $D_9$ 1.022 | 1.62041 | 60.33 | |
| $R_{15}$ −14.849 | | | | 6.18 |
| | $S_6$ 0.006 | | | |
| $R_{16}$ +8.431 | | | | 6.21 |
| | $D_{10}$ 0.816 | 1.61270 | 58.63 | |
| $R_{17}$ +60.807 | | | | 6.17 |
| | $S_7$ variable | | | |
| $R_{18}$ +12.705 | | | | 3.57 |
| | $D_{11}$ 0.108 | 1.73350 | 51.65 | |
| $R_{19}$ +3.410 | | | | 3.25 |
| | $S_8$ 2.196 | | | |
| $R_{20}$ −4.157 | | | | 2.43 |
| | $D_{12}$ 0.108 | 1.73350 | 51.65 | |
| $R_{21}$ +2.968 | | | | 2.56 |
| | $D_{13}$ 0.438 | 1.74080 | 28.09 | |
| $R_{22}$ −51.147 | | | | 2.59 |
| | $S_9$ variable | | | |
| $R_{23}$ +11.281 | | | | 2.67 |
| | $D_{14}$ 0.108 | 1.80518 | 25.43 | |
| $R_{24}$ +4.761 | | | | 2.68 |
| | $D_{15}$ 0.509 | 1.51680 | 64.17 | |
| $R_{25}$ −5.190 | | | | 2.71 |
| | $S_{10}$ 0.006 | | | |
| $R_{26}$ +5.808 | | | | 2.73 |
| | $D_{16}$ 0.343 | 1.51454 | 54.70 | |
| $R_{27}$ −12.047 | | | | 2.72 |
| | $S_{11}$ variable | | | |
| $R_{28}$ −4.037 | | | | 1.89 |
| | $D_{17}$ 0.122 | 1.62606 | 38.96 | |
| $R_{29}$ +2.151 | | | | 1.88 |
| | $D_{18}$ 0.334 | 1.80518 | 25.43 | |
| $R_{30}$ +15.783 | | | | 1.87 |
| | $S_{12}$ 2.314 | | | |
| $R_{31}$ +79.144 | | | | 1.68 |
| | $D_{19}$ 0.122 | 1.80518 | 25.43 | |
| $R_{32}$ +2.532 | | | | 1.71 |
| | $D_{20}$ 0.456 | 1.51823 | 58.98 | |
| $R_{33}$ −3.242 | | | | 1.76 |
| | $S_{13}$ 0.006 | | | |
| $R_{34}$ +3.672 | | | | 1.79 |
| | $D_{21}$ 0.273 | 1.51742 | 58.20 | |
| $R_{35}$ +34.395 | | | | 1.77 |

This objective is corrected for use with a prism of thickness 4.2 $F_o$ in the rear conjugate, said prism having a refractive index of 1.5168 and an Abbe V number of 64.17.

Thick Lens Separations during Zooming with Object at Infinity

| $F_1$ | $S_4$ | $S_7$ | $S_9$ | $S_{11}$ |
|---|---|---|---|---|
| 1.000 | 2.2827 | 0.1811 | 7.0909 | 0.3930 |
| 1.660 | 1.8881 | 1.8862 | 5.3858 | 0.7875 |
| 2.950 | 1.2748 | 3.6530 | 3.6189 | 1.3009 |
| 5.450 | 0.7929 | 5.3862 | 1.8857 | 1.8828 |
| 10.000 | 0.1990 | 7.1295 | 0.1425 | 2.4767 |

Example 6 — Table 6 — Fo = 1

| Radius | Thickness or Air Separation | | Refractive Index $n_d$ | Abbe V Number | Clear Diameter |
|---|---|---|---|---|---|
| $R_1$ +7.540 | | | | | 7.27 |
| | $D_1$ | 0.200 | 1.68900 | 49.48 | |
| $R_2$ +5.570 | | | | | 6.75 |
| | $S_1$ | 0.540 | | | |
| $R_3$ +10.230 | | | | | 6.77 |
| | $D_2$ | 0.200 | 1.68900 | 49.48 | |
| $R_4$ +6.890 | | | | | 6.39 |
| | $S_2$ | 2.000 | | | |
| $R_5$ −18.430 | | | | | 5.65 |
| | $D_3$ | 0.810 | 1.80518 | 25.43 | |
| $R_6$ −4.655 | | | | | 5.65 |
| | $D_4$ | 0.200 | 1.62041 | 60.33 | |
| $R_7$ +27.750 | | | | | 5.25 |
| | $S_3$ | 0.785 | | | |
| $R_8$ −5.075 | | | | | 4.90 |
| | $D_5$ | 0.200 | 1.72000 | 50.41 | |
| $R_9$ −14.760 | | | | | 4.90 |
| | $S_4$ | variable | | | |
| $R_{10}$ −26.335 | | | | | 4.54 |
| | $D_6$ | 0.200 | 1.80518 | 25.43 | |
| $R_{11}$ +9.575 | | | | | 4.54 |
| | $D_7$ | 0.900 | 1.41011 | 64.24 | |
| $R_{12}$ +4.970 | | | | | 4.54 |
| | $S_5$ | 0.005 | | | |
| $R_{13}$ +8.825 | | | | | 4.39 |
| | $D_8$ | 0.200 | 1.80518 | 25.43 | |
| $R_{14}$ +5.360 | | | | | 4.36 |
| | $D_9$ | 0.740 | 1.55963 | 61.21 | |
| $R_{15}$ −11.800 | | | | | 4.36 |
| | $S_6$ | 0.005 | | | |
| $R_{16}$ +4.250 | | | | | 4.22 |
| | $D_{10}$ | 0.500 | 1.58913 | 61.27 | |
| $R_{17}$ +24.984 | | | | | 4.21 |
| | $S_7$ | variable | | | |
| $R_{18}$ +4.781 | | | | | 2.91 |
| | $D_{11}$ | 0.080 | 1.73520 | 41.59 | |
| $R_{19}$ +1.778 | | | | | 2.51 |
| | $S_8$ | 2.200 | | | |
| $R_{20}$ −4.500 | | | | | 1.64 51.65 |
| | $D_{12}$ | 0.080 | 1.73350 | | |
| $R_{21}$ +2.143 | | | | | 1.70 |
| | $D_{13}$ | 0.250 | 1.80518 | 25.43 | |
| $R_{22}$ +22.202 | | | | | 1.70 |
| | $S_9$ | variable | | | |
| $R_{23}$ +5.015 | | | | | 1.75 |
| | $D_{14}$ | 0.060 | 1.80518 | 25.43 | |
| $R_{24}$ +2.550 | | | | | 1.75 |
| | $D_{15}$ | 0.320 | 1.60311 | 60.60 | |
| $R_{25}$ −5.780 | | | | | 1.76 |
| | $S_{10}$ | 0.005 | | | |
| $R_{26}$ +5.718 | | | | | 1.76 |
| | $D_{16}$ | 0.215 | 1.60311 | 60.60 | |
| $R_{27}$ −5.677 | | | | | 1.77 |
| | $S_{11}$ | variable | | | |
| $R_{28}$ −2.574 | | | | | 1.28 |
| | $D_{17}$ | 0.100 | 1.62606 | 38.96 | |
| $R_{29}$ +1.180 | | | | | 1.27 |
| | $D_{18}$ | 0.275 | 1.78470 | 26.08 | |
| $R_{30}$ +7.936 | | | | | 1.25 |
| | $S_{12}$ | 1.100 | | | |
| $R_{31}$ ∞ | | | | | 1.20 |
| | $D_{19}$ | 0.100 | 1.78470 | 26.08 | |
| $R_{32}$ +1.504 | | | | | 1.25 |
| | $D_{20}$ | 0.375 | 1.51742 | 52.20 | |
| $R_{33}$ −2.825 | | | | | 1.31 |
| | $S_{13}$ | 0.005 | | | |
| $R_{34}$ +2.606 | | | | | 1.36 |
| | $D_{21}$ | 0.225 | 1.51823 | 58.98 | |
| $R_{35}$ −21.159 | | | | | 1.37 |

Thick Lens Separations during Zooming with Object at Infinity

| F | $S_4$ | $S_7$ | $S_9$ | $S_{11}$ |
|---|---|---|---|---|
| 1.0 | 1.0299 | 0.1060 | 3.3516 | 0.0776 |
| 1.414 | 0.8375 | 0.9234 | 2.5342 | 0.2700 |
| 2.110 | 0.6039 | 1.7431 | 1.7144 | 0.5037 |
| 3.220 | 0.3304 | 2.5594 | 0.8982 | 0.7771 |
| 5.000 | 0.0260 | 3.3744 | 0.0832 | 1.0815 |

Example 7 — Table 7 — Fo = 1

| Radius | Thickness or Air Separation | | Refractive Index $n_d$ | Abbe V Number | Clear Diameter |
|---|---|---|---|---|---|
| $R_1$ +7.321 | | | | | 6.32 |
| | $D_1$ | 0.200 | 1.62041 | 60.33 | |
| $R_2$ +4.558 | | | | | 5.71 |
| | $S_1$ | 0.650 | | | |
| $R_3$ +11.364 | | | | | 5.71 |
| | $D_2$ | 0.200 | 1.62041 | 60.33 | |
| $R_4$ +5.869 | | | | | 5.32 |
| | $S_2$ | 1.575 | | | |
| $R_5$ −15.385 | | | | | 4.88 |
| | $D_3$ | 0.635 | 1.80518 | 25.43 | |
| $R_6$ −4.273 | | | | | 4.87 |
| | $D_4$ | 0.200 | 1.62280 | 56.90 | |
| $R_7$ +31.446 | | | | | 4.39 |
| | $S_3$ | 0.550 | | | |
| $R_8$ −5.181 | | | | | 4.40 |
| | $D_5$ | 0.150 | 1.69100 | 54.78 | |
| $R_9$ −17.653 | | | | | 4.43 |
| | $S_4$ | variable | | | |
| $R_{10}$ −109.890 | | | | | 4.25 |
| | $D_6$ | 0.165 | 1.80518 | 25.43 | |
| $R_{11}$ +7.416 | | | | | 4.25 |
| | $D_7$ | 0.750 | 1.51821 | 65.05 | |
| $R_{12}$ −5.199 | | | | | 4.25 |
| | $S_5$ | 0.005 | | | |
| $R_{13}$ +6.630 | | | | | 4.26 |
| | $D_8$ | 0.600 | 1.69100 | 54.78 | |
| $R_{14}$ −11.161 | | | | | 4.28 |
| | $S_6$ | 0.005 | | | |
| $R_{15}$ +4.199 | | | | | 3.95 |
| | $D_9$ | 0.750 | 1.64050 | 60.10 | |
| $R_{16}$ −11.431 | | | | | 3.89 |
| | $D_{10}$ | 0.165 | 1.80518 | 25.43 | |
| $R_{17}$ +14.251 | | | | | 3.65 |
| | $S_7$ | variable | | | |
| $R_{18}$ +5.247 | | | | | 2.49 |
| | $D_{11}$ | 0.070 | 1.74400 | 44.77 | |
| $R_{19}$ +1.727 | | | | | 2.18 |
| | $S_8$ | 1.459 | | | |
| $R_{20}$ −1.791 | | | | | 1.35 |
| | $D_{12}$ | 0.070 | 1.74400 | 44.77 | |
| $R_{21}$ +1.887 | | | | | 1.47 |
| | $D_{13}$ | 0.200 | 1.80518 | 25.43 | |
| $R_{22}$ −6.891 | | | | | 1.48 |
| | $S_9$ | variable | | | |
| $R_{23}$ −25.628 | | | | | 1.61 |
| | $D_{14}$ | 0.060 | 1.80518 | 25.43 | |
| $R_{24}$ +3.207 | | | | | 1.65 |
| | $D_{15}$ | 0.265 | 1.64328 | 47.96 | |
| $R_{25}$ −2.245 | | | | | 1.66 |
| | $S_{10}$ | 0.005 | | | |
| $R_{26}$ +5.270 | | | | | 1.67 |
| | $D_{16}$ | 0.265 | 1.51680 | 64.17 | |
| $R_{27}$ −4.676 | | | | | 1.64 |
| $R_{28}$ −1.799 | $S_{11}$ | variable | | | 1.19 |
| | $D_{17}$ | 0.100 | 1.62606 | 38.96 | |
| $R_{29}$ +1.161 | | | | | 1.22 |
| | $D_{18}$ | 0.275 | 1.80518 | 25.43 | |
| $R_{30}$ +10.273 | | | | | 1.21 |
| | $S_{12}$ | 1.693 | | | |
| $R_{31}$ −21.570 | | | | | 1.47 |
| | $D_{19}$ | 0.100 | 1.80518 | 25.43 | |
| $R_{32}$ +1.939 | | | | | 1.53 |
| | $D_{20}$ | 0.375 | 1.48749 | 70.41 | |
| $R_{33}$ −2.604 | | | | | 1.58 |
| | $S_{13}$ | 0.005 | | | |
| $R_{34}$ +2.302 | | | | | 1.71 |
| | $D_{21}$ | 0.240 | 1.57099 | 50.88 | |
| $R_{35}$ −16.203 | | | | | 1.71 |

Thick Lens Separations during Zooming with Object at Infinity

| F | $S_4$ | $S_7$ | $S_9$ | $S_{11}$ |
|---|---|---|---|---|
| 1.0 | 1.0128 | −0.0157 | 2.9323 | 0.1027 |
| 1.425 | 0.8173 | 0.6082 | 2.3083 | 0.2983 |
| 2.110 | 0.5851 | 1.2448 | 1.6717 | 0.5305 |
| 3.220 | 0.3206 | 1.8931 | 1.0235 | 0.7949 |
| 5.000 | 0.0345 | 2.5573 | 0.3593 | 1.0810 |

Example 8 — Table 8 — Fo = 1

| Radius | Thickness or Air Separation | | Refractive Index $n_d$ | Abbe V Number | Clear Diameter |
|---|---|---|---|---|---|
| $R_1$ +8.547 | | | | | 6.10 |
| | $D_1$ | 0.200 | 1.62041 | 60.33 | |
| $R_2$ +4.776 | | | | | 5.51 |
| | $S_1$ | 0.680 | | | |
| $R_3$ +15.528 | | | | | 5.46 |
| | $D_2$ | 0.200 | 1.62041 | 60.33 | |
| $R_4$ +6.394 | | | | | 5.11 |
| | $S_2$ | 1.555 | | | |
| $R_5$ −21.834 | | | | | 4.57 |
| | $D_3$ | 0.650 | 1.80518 | 25.43 | |
| $R_6$ −4.504 | | | | | 4.53 |

| Radius | Thickness or Air Separation | Refractive Index $n_d$ | Abbe V Number | Clear Diameter |
|---|---|---|---|---|
| $R_7$ +26.178 | | | | |
| | $D_4$ | 0.200 | 1.61484 | 51.16 |
| $R_8$ −5.102 | | | | |
| | $S_3$ | 0.595 | | |
| $R_9$ −15.814 | | | | |
| | $D_5$ | 0.150 | 1.69100 | 54.78 |
| $R_{10}$ −113.636 | | | | |
| | $S_4$ | variable | | |
| $R_{11}$ +7.587 | | | | |
| | $D_6$ | 0.165 | 1.80518 | 25.43 |
| $R_{12}$ −5.249 | | | | |
| | $D_7$ | 0.865 | 1.51821 | 65.05 |
| $R_{13}$ +6.738 | | | | |
| | $S_5$ | 0.005 | | |
| $R_{14}$ −11.525 | | | | |
| | $D_8$ | 0.610 | 1.69100 | 54.78 |
| $R_{15}$ +4.292 | | | | |
| | $S_6$ | 0.005 | | |
| $R_{16}$ −11.710 | | | | |
| | $D_9$ | 0.730 | 1.64328 | 47.96 |
| $R_{17}$ +13.697 | | | | |
| | $D_{10}$ | 0.165 | 1.80518 | 25.43 |
| $R_{18}$ +6.000 | | | | |
| | $S_7$ | variable | | |
| $R_{19}$ +1.718 | | | | |
| | $D_{11}$ | 0.070 | 1.73350 | 51.65 |
| $R_{20}$ −1.791 | | | | |
| | $S_8$ | 1.310 | | |
| $R_{21}$ +9.434 | | | | |
| | $D_{12}$ | 0.070 | 1.73350 | 51.65 |
| $R_{22}$ +2.381 | | | | |
| | $D_{13}$ | 0.070 | 1.68852 | 30.62 |
| $R_{23}$ −7.909 | | | | |
| | $D_{14}$ | 0.275 | 1.80518 | 25.43 |
| $R_{24}$ −25.629 | | | | |
| | $S_9$ | variable | | |
| $R_{25}$ +3.207 | | | | |
| | $D_{15}$ | 0.60 | 1.80518 | 25.43 |
| $R_{26}$ −2.245 | | | | |
| | $D_{16}$ | 0.365 | 1.64050 | 60.10 |
| $R_{27}$ +5.270 | | | | |
| | $S_{10}$ | 0.005 | | |
| $R_{28}$ −4.752 | | | | |
| | $D_{17}$ | 0.215 | 1.51821 | 65.05 |
| $R_{29}$ −1.878 | | | | |
| | $S_{11}$ | variable | | |
| $R_{30}$ +1.878 | | | | |
| | $D_{18}$ | 0.070 | 1.62280 | 56.90 |
| $R_{31}$ −7.042 | | | | |
| | $D_{19}$ | 0.275 | 1.76180 | 26.95 |
| $R_{32}$ −6.944 | | | | |
| | $S_{12}$ | 1.300 | | |
| $R_{33}$ +2.041 | | | | |
| | $D_{20}$ | 0.070 | 1.80518 | 25.43 |
| $R_{34}$ −1.805 | | | | |
| | $D_{21}$ | 0.325 | 1.51821 | 65.05 |
| $R_{35}$ +76.923 | | | | |
| | $S_{13}$ | 0.005 | | |
| $R_{36}$ −3.534 | | | | |
| | $D_{22}$ | 0.240 | 1.51821 | 65.05 |

Thick Lens Separations during Zooming with Object at Infinity

| F | $S_4$ | $S_7$ | $S_9$ | $S_{11}$ |
|---|---|---|---|---|
| 1.0 | 1.1559 | 0.0944 | 2.6237 | 0.1003 |
| 1.425 | 0.9477 | 0.7054 | 2.0127 | 0.3085 |
| 2.110 | 0.6997 | 1.3286 | 1.3894 | 0.5566 |
| 3.220 | 0.4161 | 1.9632 | 0.7549 | 0.8401 |
| 5.000 | 0.1085 | 2.6132 | 0.1049 | 1.1477 |

Example 9 — Table 9 — Fo = 1

| Radius | Thickness or Air Separation | Refractive Index $n_d$ | Abbe V Number | Clear Diameter |
|---|---|---|---|---|
| $R_1$ +8.264 | | | | |
| | $D_1$ | 0.200 | 1.62041 | 60.33 |
| $R_2$ +4.682 | | | | |
| | $S_1$ | 0.550 | | |
| $R_3$ +15.528 | | | | |
| | $D_2$ | 0.200 | 1.62041 | 60.33 |
| $R_4$ +6.158 | | | | |
| | $S_2$ | 1.475 | | |
| $R_5$ −29.189 | | | | |
| | $D_3$ | 0.525 | 1.80518 | 25.43 |
| $R_6$ −4.505 | | | | |
| | $D_4$ | 0.200 | 1.61484 | 51.16 |
| $R_7$ +19.525 | | | | |
| $R_8$ +5.010 | | | | |
| | $D_5$ | 0.200 | 1.68900 | 49.48 |
| $R_9$ −15.521 | | | | |
| | $S_4$ | variable | | |
| $R_{10}$ −161.290 | | | | 4.13 |
| $R_{11}$ +8.00 | | | | 4.10 |
| $R_{12}$ −5.537 | | | | 4.10 |
| $R_{13}$ +8.210 | | | | 3.87 |
| $R_{14}$ +3.946 | | | | 3.84 |
| $R_{15}$ −17.361 | | | | 3.86 |
| $R_{16}$ +3.470 | | | | 4.01 |
| $R_{17}$ +17.304 | | | | 4.00 |
| $R_{18}$ +4.264 | | | | 3.74 |
| $R_{19}$ +1.559 | | | | 3.64 |
| $R_{20}$ −1.999 | | | | 3.42 |
| $R_{21}$ +2.098 | | | | 2.18 |
| $R_{22}$ −29.940 | | | | 1.92 |
| $R_{23}$ +22.946 | | | | 1.39 |
| $R_{24}$ +2.340 | | | | 1.47 |
| $R_{25}$ −2.710 | | | | 1.54 |
| $R_{26}$ +4.154 | | | | 1.57 |
| $R_{27}$ −4.018 | | | | 1.62 |
| $R_{28}$ −1.916 | | | | 1.66 |
| $R_{29}$ +1.361 | | | | 1.69 |
| $R_{30}$ +13.301 | | | | 1.70 |
| $R_{31}$ −5.734 | | | | 1.70 |
| $R_{32}$ +2.241 | | | | 1.23 |
| $R_{33}$ −1.595 | | | | 1.24 |
| $R_{34}$ +5.239 | | | | 1.25 |
| $R_{35}$ −5.494 | | | | 1.19 |

(Clear diameters continued: 1.23, 1.28, 1.31, 1.33)

| | | | | |
|---|---|---|---|---|
| | $D_6$ | 0.165 | 1.80518 | 25.43 |
| | $D_7$ | 0.520 | 1.62041 | 60.33 |
| | $S_5$ | 0.005 | | |
| | $D_8$ | 0.165 | 1.80518 | 25.43 |
| | $D_9$ | 0.530 | 1.64050 | 60.10 |
| | $S_6$ | 0.005 | | |
| | $D_{10}$ | 0.400 | 1.62230 | 53.16 |
| | $S_7$ | variable | | |
| | $D_{11}$ | 0.070 | 1.73350 | 51.65 |
| | $S_8$ | 1.272 | | |
| | $D_{12}$ | 0.140 | 1.68900 | 49.48 |
| | $D_{13}$ | 0.275 | 1.80518 | 25.43 |
| | $S_9$ | variable | | |
| | $D_{14}$ | 0.060 | 1.80518 | 25.43 |
| | $D_{15}$ | 0.415 | 1.64050 | 60.10 |
| | $S_{10}$ | 0.005 | | |
| | $D_{16}$ | 0.270 | 1.51821 | 65.05 |
| | $S_{11}$ | variable | | |
| | $D_{17}$ | 0.070 | 1.62299 | 58.06 |
| | $D_{18}$ | 0.275 | 1.80518 | 25.43 |
| | $S_{12}$ | 0.955 | | |
| | $D_{19}$ | 0.070 | 1.80518 | 25.43 |
| | $D_{20}$ | 0.325 | 1.48749 | 70.41 |
| | $S_{13}$ | 0.005 | | |
| | $D_{21}$ | 0.240 | 1.51680 | 64.17 |

(Clear diameters: 3.45, 3.45, 3.42, 3.38, 3.38, 3.28, 3.25, 2.15, 1.89, 1.42, 1.56, 1.58, 1.63, 1.67, 1.71, 1.72, 1.72, 1.22, 1.23, 1.22, 1.36, 1.42, 1.44, 1.50, 1.51)

Thick Lens Separations during Zooming with Object at Infinity

| F | $S_4$ | $S_7$ | $S_9$ | $S_{11}$ |
|---|---|---|---|---|
| 1.0 | 1.0818 | 0.1030 | 2.6618 | 0.1016 |
| 1.425 | 0.9039 | 0.7355 | 2.0293 | 0.2795 |
| 2.110 | 0.6895 | 1.3740 | 1.3908 | 0.4939 |
| 3.220 | 0.4413 | 2.0154 | 0.7494 | 0.7421 |
| 5.000 | 0.1681 | 2.6624 | 0.1024 | 1.0153 |

Example 10 — Table 10 — Fo = 1

| Radius | Thickness or Air Separation | Refractive Index $n_d$ | Abbe V Number | Clear Diameter |
|---|---|---|---|---|
| $R_1$ +7.870 | | | | 5.68 |
| | $D_1$ | 0.207 | 1.64050 | 60.10 |
| $R_2$ +4.681 | | | | 5.15 |
| | $S_1$ | 0.627 | | |
| $R_3$ +20.150 | | | | 5.14 |
| | $D_2$ | 0.207 | 1.64050 | 60.10 |
| $R_4$ +6.534 | | | | 4.79 |
| | $S_2$ | 1.528 | | |
| $R_5$ −35.098 | | | | 4.35 |
| | $D_3$ | 0.518 | 1.80518 | 25.43 |
| $R_6$ −5.028 | | | | 4.32 |
| | $D_4$ | 0.207 | 1.58893 | 51.37 |
| $R_7$ +16.895 | | | | 3.90 |
| | $S_3$ | 0.502 | | |
| $R_8$ −5.279 | | | | 3.89 |
| | $D_5$ | 0.207 | 1.72000 | 50.41 |
| $R_9$ −13.814 | | | | 3.88 |
| | $S_4$ | variable | | |
| $R_{10}$ +152.314 | | | | 3.42 |
| | $D_6$ | 0.171 | 1.80518 | 25.43 |
| $R_{11}$ +7.430 | | | | 3.41 |
| | $D_7$ | 0.502 | 1.62041 | 60.33 |
| $R_{12}$ −6.886 | | | | 3.41 |
| | $S_5$ | 0.005 | | |
| $R_{13}$ +8.448 | | | | 3.45 |
| | $D_8$ | 0.171 | 1.80518 | 25.43 |
| $R_{14}$ +4.511 | | | | 3.42 |
| | $D_9$ | 0.539 | 1.64050 | 60.10 |

| Radius | Thickness or Air Separation | | Refractive Index $n_d$ | Abbe V Number |
|---|---|---|---|---|
| $R_{15}$ −13.313 | | | | |
| | $S_6$ | 0.005 | | |
| $R_{16}$ +4.136 | | | | |
| | $D_{10}$ | 0.378 | 1.64050 | 60.10 |
| $R_{17}$ +26.721 | | | | |
| | $S_7$ | variable | | |
| $R_{18}$ +5.003 | | | | |
| | $D_{11}$ | 0.073 | 1.78800 | 47.40 |
| $R_{19}$ +1.744 | | | | |
| | $S_8$ | 1.370 | | |
| $R_{20}$ +2.237 | | | | |
| | $D_{12}$ | 0.073 | 1.71700 | 47.98 |
| $R_{21}$ +2.085 | | | | |
| | $D_{13}$ | 0.280 | 1.80518 | 25.43 |
| $R_{22}$ −22.925 | | | | |
| | $S_9$ | variable | | |
| $R_{23}$ +25.139 | | | | |
| | $D_4$ | 0.062 | 1.80518 | 25.43 |
| $R_{24}$ +2.256 | | | | |
| | $D_{15}$ | 0.466 | 1.64328 | 47.96 |
| $R_{25}$ −2.739 | | | | |
| | $S_{10}$ | 0.005 | | |
| $R_{26}$ +3.259 | | | | |
| | $D_{16}$ | 0.321 | 1.48749 | 70.41 |
| $R_{27}$ −4.491 | | | | |
| | $S_{11}$ | variable | | |
| $R_{28}$ −2.081 | | | | |
| | $D_{17}$ | 0.073 | 1.68900 | 49.48 |
| $R_{29}$ +1.456 | | | | |
| | $D_{18}$ | 0.259 | 1.80518 | 25.43 |
| $R_{30}$ +24.097 | | | | |
| | $S_{12}$ | 0.966 | | |
| $R_{31}$ −10.766 | | | | |
| | $D_{19}$ | 0.192 | 1.51821 | 65.05 |
| $R_{32}$ −2.493 | | | | |
| | $S_{13}$ | 0.201 | | |
| $R_{33}$ +10.462 | | | | |
| | $D_{20}$ | 0.073 | 1.80518 | 25.43 |
| $R_{34}$ +1.388 | | | | |
| | $D_{21}$ | 0.321 | 1.55232 | 63.46 |
| $R_{35}$ −2.754 | | | | |

Thick Lens Separations during Zooming with Object at Infinity

| F | $S_4$ | $S_7$ | $S_9$ | $S_{11}$ |
|---|---|---|---|---|
| 1.0 | 1.0940 | 0.0966 | 2.7941 | 0.2582 |
| 1.425 | 0.9214 | 0.7683 | 2.1224 | 0.4308 |
| 2.110 | 0.7121 | 1.4424 | 1.4482 | 0.6401 |
| 3.220 | 0.4676 | 2.1144 | 0.7763 | 0.8846 |
| 5.000 | 0.1962 | 2.7862 | 0.1045 | 1.1560 |

Example 11 — Table 11 — Fo = 1

| Radius | Thickness or Air Separation | | Refractive Index $n_d$ | Abbe V Number | Clear Diameter |
|---|---|---|---|---|---|
| $R_1$ +7.036 | | | | | 5.70 |
| | $D_1$ | 0.207 | 1.65160 | 58.52 | |
| $R_2$ +4.266 | | | | | 5.14 |
| | $S_1$ | 0.678 | | | |
| $R_3$ +15.837 | | | | | 5.12 |
| | $D_2$ | 0.207 | 1.65160 | 58.52 | |
| $R_4$ +6.628 | | | | | 4.79 |
| | $S_2$ | 1.269 | | | |
| $R_5$ +21.668 | | | | | 4.37 |
| | $D_3$ | 0.207 | 1.64250 | 57.96 | |
| $R_6$ +3.649 | | | | | 4.00 |
| | $D_4$ | 0.414 | 1.80518 | 25.43 | |
| $R_7$ +8.307 | | | | | 3.97 |
| | $S_3$ | 0.554 | | | |
| $R_8$ −6.631 | | | | | 3.96 |
| | $D_5$ | 0.207 | 1.72000 | 50.41 | |
| $R_9$ −28.611 | | | | | 3.92 |
| | $S_4$ | variable | | | |
| $R_{10}$ −167.054 | | | | | 3.42 |
| | $D_6$ | 0.171 | 1.80518 | 25.43 | |
| $R_{11}$ +8.066 | | | | | 3.42 |
| | $D_7$ | 0.502 | 1.64050 | 60.10 | |
| $R_{12}$ −6.777 | | | | | 3.42 |
| | $S_5$ | 0.005 | | | |
| $R_{13}$ +8.448 | | | | | 3.46 |
| | $D_8$ | 0.171 | 1.80518 | 25.43 | |
| $R_{14}$ +4.515 | | | | | 3.42 |
| | $D_9$ | 0.539 | 1.64050 | 60.10 | |
| $R_{15}$ −13.268 | | | | | 3.42 |
| | $S_6$ | 0.005 | | | |
| $R_{16}$ +4.103 | | | | | 3.32 |
| | $D_{10}$ | 0.378 | 1.64050 | 60.10 | |
| $R_{17}$ +24.436 | | | | | 3.29 |
| | $S_7$ | variable | | | |
| $R_{18}$ +5.077 | | | | | 2.18 |
| | $D_{11}$ | 0.073 | 1.78800 | 47.40 | |
| $R_{19}$ +1.742 | | | | | 1.95 |
| | $S_8$ | 1.370 | | | |
| $R_{20}$ −2.215 | | | | | 1.53 |
| | $D_{12}$ | 0.073 | 1.72000 | 50.41 | |
| $R_{21}$ +2.085 | | | | | 1.66 |
| | $D_{13}$ | 0.280 | 1.80518 | 25.43 | |
| $R_{22}$ −18.794 | | | | | 1.68 |
| | $S_9$ | variable | | | |
| $R_{23}$ +25.139 | | | | | 1.74 |
| | $D_{14}$ | 0.062 | 1.80518 | 25.43 | |
| $R_{24}$ +2.255 | | | | | 1.79 |
| | $D_{15}$ | 0.466 | 1.65830 | 57.26 | |
| $R_{25}$ −2.791 | | | | | 1.83 |
| | $S_{10}$ | 0.005 | | | |
| $R_{26}$ +3.146 | | | | | 1.84 |
| | $D_{16}$ | 0.321 | 1.48749 | 70.41 | |
| $R_{27}$ −5.067 | | | | | 1.83 |
| | $S_{11}$ | variable | | | |
| $R_{28}$ −2.102 | | | | | 1.33 |
| | $D_{17}$ | 0.073 | 1.69680 | 56.18 | |
| $R_{29}$ +1.487 | | | | | 1.34 |
| | $D_{18}$ | 0.259 | 1.80518 | 25.43 | |
| $R_{30}$ +22.637 | | | | | 1.33 |
| | $S_{12}$ | 0.721 | | | |
| $R_{31}$ +863.11 | | | | | 1.31 |
| | $D_{19}$ | 0.192 | 1.48749 | 70.41 | |
| $R_{32}$ −2.523 | | | | | 1.31 |
| | $S_{13}$ | 0.487 | | | |
| $R_{33}$ +15.646 | | | | | 1.13 |
| | $D_{20}$ | 0.073 | 1.80518 | 25.43 | |
| $R_{34}$ +1.332 | | | | | 1.14 |
| | $D_{21}$ | 0.321 | 1.55232 | 63.46 | |
| $R_{35}$ −2.629 | | | | | 1.16 |

Thick Lens Separations during Zooming with Object at Infinity

| F | $S_4$ | $S_7$ | $S_9$ | $S_{11}$ |
|---|---|---|---|---|
| 1.0 | 1.3592 | 0.1134 | 2.7960 | 0.2482 |
| 1.425 | 1.1866 | 0.7852 | 1.1242 | 0.4207 |
| 2.110 | 0.9773 | 1.4593 | 1.4501 | 0.6300 |
| 3.220 | 0.7328 | 2.1313 | 0.7781 | 0.8745 |
| 5.000 | 0.4614 | 2.8030 | 0.1064 | 1.1460 |

We refer first to Examples 1 and 2 as shown in FIGS. 3 and 4, respectively.

In both these examples, the maximum value Fm of the equivalent focal length of the objective in the range of variation is 10 times the minimum value Fo thereof. In the first example the back focal distance, from the rear surface of the objective to the image plane, is 0.7530 Fo, whilst in the second example the back focal distance is 2.8638 Fo.

In the first example the objective covers a semi-angular field of view varying from 30° at Fo to 3° at Fm, whilst in the second example the corresponding values are also 30° and 3°. The relative aperture of the complete objective is f/2.0 in the first example and f/4.0 in the second example.

The iris diaphragm is stationary and located just in front of the front surface $R_{28}$ of the rear assembly in both examples.

In the first example, the equivalent focal length $f_1$ of the front member (surfaces $R_1$ to $R_9$ inclusive) is −8.7662 Fo, the equivalent focal length $f_2$ of the second member (surfaces $R_{10}$ to $R_{16}$ inclusive) is 6.9394 Fo, the equivalent focal length $f_3$ of the third member (surfaces $R_{17}$ to $R_{23}$ inclusive) is −3.1328 Fo, whilst the equivalent focal length $f_4$ of the fourth member (surfaces $R_{24}$ to $R_{28}$ inclusive) is 4.1000 Fo, the positive and negative signs respectively representing convergence and divergence.

The corresponding figures for the second example are:
$f_1 = -4.3811$ Fo;
$f_2 = 3.4697$ Fo;
$f_3 = -1.5664$ Fo;
$f_4 = 2.0500$ Fo.

The mean value (x) of the sum of the distances from the rear nodal point of the second member to the front nodal point of the third member and from the rear nodal point of the third member to the front nodal point of the fourth member is 9.5474 in the first example and 4.7737 in the second example.

The magnification ratios $g_2$, $g_3$ and $g_4$ of the second, third and fourth members are respectively 1.4180, 3.0000 and 2.3507 in the first example and also 1.4180, 3.0000 and 2.3507 in the second example.

These magnification ratios, taken in conjunction with the values of $f_2$ and $f_4$ given above for the two examples, in each case give rise to equal movements of the second and fourth members during zooming. This makes possible the use of a relatively simple conventional zoom control mechanism, because the mounts for the second and fourth members can be rigidly connected together. In contrast to a known five member zoom lens performing somewhat similar relative movements, it is an important characteristic of the invention that this equal movement of the second and fourth members can be obtained without making $f_2$ and $f_4$ equal.

It can thus readily be ascertained that both the first two examples conform to the specified multiple inequalities (a) and (b), as necessary in order to achieve a zoom lens of wide target specification. In fact, these two examples also conform to a narrower range of inequalities defined by the relationships:

(h) $1.8\ Fm/N > f_2 > 0.6\ Fm/N$ (i) $f_2 > f_4$ (j) $\sqrt[3]{R} > g_2 > 1$ (k) $\sqrt[3]{R} > g_4 > g_2$ (l)
$$\frac{2(f_2+f_4)-x}{3} > f_3 > \frac{2(f_2+f_4)-x}{6}$$

(m) $\sqrt[1.5]{R} > g_3 > g_4$.

The arrangement of the movable members in both examples is such as to give a high standard of stabilization of the various aberrations throughout the zooming range, so that, with the front member designed to give a good standard of stabilization of the aberrations throughout its range of independent movement for focusing purposes, the stabilized aberrations in the front assembly (the first four members) can be balanced out by suitable design of the stationary rear assembly (the rear member).

As far as the front member is concerned, it should be explained that, for the direct purpose of the invention, it is of major importance only that such member should be divergent with a focal length ($f_1$) numerically greater than $f_2$. With the specified design of the second, third and fourth members, this construction of the front member enables focusing to be effected down to a few short object distance of only a few feet, whilst keeping such front member of the practical dimensions appearing from the tables. The detailed construction of the front member is dependent on the form of focusing movement employed and the manner in which aberrations are stabilized in this front member during the focusing movement. Although the requirements for focusing form no part of the present invention, the front members specified in the tables are in fact designed to provide good aberration stabilization during bodily movement of the front member for focusing, regardless of the position of the second, third and fourth members movable for variation of the equivalent focal length of the complete objective.

The stationary rear member is of little importance for the direct purpose of the invention. It may be convergent or divergent; furthermore its power can be very small if desired, as revealed by one of the above-described thin lens examples. Thus, this rear member may take a variety of forms, to impart to the complete objective the desired range of absolute focal lengths and the desired back focal length, the construction being such as to afford the number of parameters necessary for correction of the various aberrations stabilized in the front assembly. The rear members specified in the tables are both designed to provide good aberration correction of the aberrations stabilized in the respective zooming systems in front of them. In fact, as clearly appears from the tables, the first four members of the second example are similar to the first four members of the first example, but scaled to provide an objective of differing $f$-number. Clearly, without a redesigned rear member, the range of absolute focal lengths and back focal length of the second example would be correspondingly scaled with respect to the first example. In a wide specification zoom lens of such high quality as the examples given above, the rear member must necessarily be fairly complex; however, in order to assist in aberration correction whilst keeping the axial length of the rear member reasonably short, said member is provided with an aspheric surface, which in each example is the front surface $R_{29}$ of such member.

We turn now to the third to fifth examples as illustrated in FIG. 5.

In the third example, the maximum equivalent focal length $Fm$ of the objective in the range of variation is substantially 10 times the minimum value $Fo$ thereof. In fact, R is equal to 10.0024. The back focal distance, measured through air from the rear surface of the objective to the image plane, is 3.828 $Fo$.

The objective covers a semi-angular field of view varying from 30° at $Fo$ to 3° at $Fm$, whilst the relative aperture is $f/2.1$, whereby N is equal to 2.1.

The iris diaphragm is stationary and located just in front of the front surface $R_{28}$ of the rear assembly.

The equivalent focal lengths of the second, third and fourth members are, respectively, +6.2875 $Fo$, −3.1562 $Fo$ and +4.8324 $Fo$, the positive and negative signs respectively representing convergence and divergence, whilst the magnification ratios $g_2$, $g_3$ and $g_4$ for these members are, respectively, 1.552, 3.2179 and 2.0028.

The mean value ($x$) of the sum of the distances from the rear nodal point of the second member to the front nodal point of the third member and from the rear nodal point of the third member to the front nodal point of the fourth member is 12.1790.

In the fourth example, $Fm/Fo$ (R) is equal to 9.99998. The back focal distance, measured through air from the rear surface of the objective to the image plane, is 3.925 $Fo$.

The objective of this fourth example covers a similar angular field of view to the objective of the third example, and has a relative aperture of $f/2.2$, whereby N is equal to 2.2. The stationary iris diaphragm is again located just in front of the rear assembly.

The equivalent focal lengths of the second, third and fourth members are, respectively, $+6.1440$ $Fo$, $-3.0702$ $Fo$ and $+4.8232$ $Fo$, whilst the magnification ratios $g_2$, $g_3$ and $g_4$ for these members are, respectively, 1.569, 3.202 and 1.991. The parameter $x$ has the value 11.721.

In the fifth example, $Fm/Fo$ (R) is equal to 10.0000, whilst the back focal distance measured as previously is 3.8136.

The objective of this fifth example again covers a similar angular field, but has a smaller relative aperture of $f/2.54$, whereby N is equal to 2.54. The stationary iris diaphragm is, as before, located just in front of the rear assembly.

The equivalent focal lengths of the second, third and fourth members are, respectively, $+5.45365$ $Fo$, $-2.7089$ $Fo$ and $+4.1917$ $Fo$, whilst the magnification ratios $g_2$, $g_3$ and $g_4$ for these members are, respectively, 1.5496, 3.2156 and 2.0068. The parameter $x$ has the value 10.5203.

Whilst $f_4$ is approximately equal to $0.76 f_2$ in Example 3, $0.78 f_2$ in Example 4 and $0.77 f_2$ in Example 5, in each instance the above-mentioned magnification ratios give rise to equal movements of the second and fourth members during zooming, which enables a relatively simple zoom control mechanism to be used.

Again, as far as the front member is concerned, it is of importance to the invention only that it should be divergent, preferably with an equivalent focal length ($f_1$) greater than $f_2$. In the third example, $f_1$ is equal to $-6.8373$ $Fo$, while in the fourth and fifth examples $f_1$ is equal to $-6.6510$ $Fo$ and $-5.8683$ $Fo$, respectively. Focusing can, if desired, be effected by a bodily movement of the front member in each example, but this is not relevant to the present invention, which is concerned with the zooming system constituted by the second, third and fourth members.

Likewise, and also as before, the stationary rear member is of little importance for the direct purpose of the invention. In each example, the specified design of the second, third and fourth members enables the aberrations to be accurately stabilized during zooming, at a convenient level which permits the rear member to take a variety of forms affording the necessary parameters for correction of said aberration level, as well as achieving the desired back focal length. The fifth example having been designed for a somewhat narrower relative aperture, it is to be noted that the dimensional scale of the complete objective is somewhat reduced, approximately proportionately, compared with the third and fourth examples.

In fact, the front member given in each table is again such as to give good stabilization of aberrations during focusing, and the rear member is such as to give a very high degree of correction of the aberrations thus stabilized during focusing and zooming.

It can readily be ascertained that the above three further examples conform to the multiple inequalities (a) and (b), although again, in fact, these examples also conform to a narrower range of inequalities defined by the following modified limits:

$1.8 Fm/N > f_2 > 0.6 Fm/N$ $f_2 > f_4 > 0.6 f_2$ $\sqrt[3]{R} > g_2 > 1$ $\sqrt[2]{R} > g_4 > g_2$ $\dfrac{2(f_2+f_4)-x}{2.5} > f_3 > \dfrac{2(f_2+f_4)-x}{5}$ $\sqrt[1.5]{R} > g_3 > g_4$.

This combination differs from but overlaps the combination of the above-stated relationships (h) to (m). This is mainly because the third to fifth examples utilize an improved thick lens construction of the second and third members more particularly to achieve better stabilization and correction of coma. Thus, more especially, the third to fifth examples are characterized by a second member comprising two convergent compound components followed by a rear simple convergent component, a third member comprising a front simple divergent component and a compound divergent component spaced behind the simple divergent component by a separation laying between $0.5 f_3$ and $f_3$, and a fourth member comprising a compound convergent component followed by a simple convergent compound.

For the development of this kind of thick lens construction, as distinct from the kind typified by the first two examples, it is preferred to use an optimized thin lens construction of which the thin lens parameters are defined within the modified limits slightly different from those applicable to the first two examples.

As far as these modified limits are concerned, the inequalities concerned evaluate as follows for the third example given:

$8.571 > 6.2875 > 2.8571$
$6.287 > 4.8324 > 3.7722$
$2.154 > 1.552 > 1$
$3.1626 > 2.0028 > 1.552$
$4.0244 > 3.1562 > 2.0122$
$4.6415 > 3.2179 > 2.0028$

For the fourth example, these relationships evaluate as follows:

$8.1818 > 6.14395 > 2.7273$
$6.1439 > 4.8232 > 3.6863$
$2.1545 > 1.7249 > 1$
$3.1623 > 1.9909 > 1.7249$
$4.0853 > 3.07017 > 2.0426$
$4.6415 > 3.2020 > 1.9909$

For the fifth example, the relationships evaluate as:

$7.0866 > 5.4536 > 2.3622$
$5.4536 > 4.19170 > 3.2722$
$2.1545 > 1.5496 > 1$
$3.162 > 2.0068 > 1.5496$
$3.5081 > 2.7089 > 1.7540$
$4.6415 > 3.2156 > 2.0068$

It can also be seen from the tables that in each of the third to fifth examples the second member comprises two convergent compound components followed by a simple convergent component, that the third member comprises a divergent compound component axially spaced to the rear of a simple divergent component by a separation of 2.488 $Fo$, i.e., $0.788 f_3$ in Example 3, of 2.42 $Fo$, i.e., $0.788 f_3$ in Example 4 and of 2.196 $Fo$, i.e., $0.801 f_3$ in Example 5, whilst the fourth member comprises a compound convergent component followed by a simple convergent component.

It can also readily be determined that the examples conform with the preferred relationships above-specified under headings (1) to (6).

The first five examples are representative of possible examples of zoom lens in accordance with the invention suitable for use in live television photography. In cinematography, a very wide range of focal length variation is less important, but objectives still have to be designed to meet a wide target specification because mechanical requirements and requirements as to optical performance are more severe. The sixth to eleventh examples are representative of a variety of possible examples of zoom lens in accordance with the invention for use in cinematography.

In each of these further examples, the maximum value $Fm$ of the equivalent focal length of the objective in the range of variation is five times the minimum value $Fo$ thereof. The back focal distance, from the rear surface of the objective to the image plane, is, for the sixth to eleventh examples in sequence, 2.940 $Fo$, 3.272 $Fo$, 2.858 $Fo$, 3.151 $Fo$, 3.097 $Fo$ and 2.899 $Fo$.

In each example the objective covers a semiangular field of view varying from 30° at $Fo$ to 3° at $Fm$. The relative aperture of the objective is $f/2.8$ in the sixth, tenth and eleventh examples and $f/2.9$ in the seventh to ninth examples, whereby N is equal to 2.8 or 2.9 in accordance therewith.

The iris diaphragm is again located just in front of the front surface $R_{28}$ of the rear assembly.

In the sixth example, the equivalent focal length $f_1$ of the front member (surfaces $R_1$ to $R_9$) is $-4.8000\ Fo$, the equivalent focal length $f_2$ of the second member (surfaces $R_{10}$ to $R_{17}$) is $+3.9290\ Fo$, the equivalent focal length of the third member (surfaces $R_{18}$ to $R_{22}$) is $-1.9300$ and the equivalent focal length of the fourth member (surfaces $R_{23}$ to $R_{27}$) is $+2.5802$, the positive and negative signs representing convergence and divergence respectively.

The corresponding figures for the seventh example in terms of $Fo$ are: $f_1 = -3.8425$, $f_2 = 3.1725$, $f_3 = -1.5450$, $f_4 = 2.4108$.

For the eighth example: $f_1 = -3.8425$, $f_2 = 3.2424$, $f_3 = -1.5450$, $f_4 = 2.4108$.

For the ninth example: $f_1 = -3.8425$, $f_2 = 3.1605$, $f_3 = -1.5450$, $f_4 = 2.2167$.

For the tenth example: $f_1 = -3.9798$, $f_2 = 3.3102$, $f_3 = -1.6002$, $f_4 = 2.2198$.

For the eleventh example: $f_1 = -3.9798$, $f_2 = 3.3102$, $f_3 = -1.6002$, $f_4 = 2.2198$.

The magnification ratios $g_2$, $g_3$ and $g_4$ of the second, third and fourth members are respectively 1.2905, 2.1959 and 1.7644 in the sixth example.

For the seventh example, $g_2 = 1.3525$, $g_3 = 2.2136$ and $g_4 = 1.6701$.

For the eighth example, $g_2 = 1.3503$, $g_3 = 2.1951$ and $g_4 = 1.6869$.

For the ninth example, $g_2 = 1.3181$, $g_3 = 2.1912$ and $g_4 = 1.7311$.

For the tenth and eleventh examples, $g_2 = 1.2972$, $g_3 = 2.1913$ and $g_4 = 1.7589$.

As before, in each example, these magnification ratios are taken in conjunction with $f_2$ and $f_4$ to impart equal movements of the second and fourth members during zooming.

Further, the remarks previously made with regard to the importance of the first member and the rear member are equally applicable to the sixth to eleventh examples.

The mean value (x) of the sum of the distances from the rear nodal point of the second member to the front nodal point of the third member and from the rear nodal point of the third member to the front nodal point of the fourth member is 6.128 in the sixth example, 5.383 in the seventh example, 5.2188 in the eighth example, 4.939 in the ninth example, 5.1236 in the tenth example and 5.1236 in the eleventh example.

It can thus readily be ascertained by simple arithmetic that the sixth to eleventh examples all comply with the above-mentioned relationships (a) and (b). However, whereas in the first five examples for television use $f_2$ is less than $1.5Fm/N$, in the subsequent six examples for cinematography $f_2$ lies between $1.5Fm/N$ and $2.5Fm/N$.

The following points are of general interest in connection with the examples. Whereas in the third example $f_2$ is equal to about $1.3Fm/N$, in the sixth example $f_2$ is approximately equal to $2.2Fm/N$, and in the other example $f_2$ has various intermediate values in terms of $Fm/N$. $f_4$ is equal to about $0.58\ f_2$ in the first example, but is as high as about $0.78\ f_2$ in the fourth example, the other examples again showing intermediate values for $f_4$ in terms of $f_2$. $g_4$ is as high as about 2.35 in the first example, but as low as about 1.67 in the seventh example, whereas $g_2$ is equal to about 1.72 in the fourth example but about 1.30 in the tenth and eleventh examples. The other examples show various intermediate values for $g_4$ and $g_2$, but in all cases it is to be noted that $g_4$ is greater than $g_2$. $g_3$ is equal to about 3.22 in the fifth example but is about 2.19 in the last three examples. Again however, in each individual case $g_3$ is greater than $g_4$. In the first example, $f_3$ is equal to about $[2(f_2 + f_4) - x]/4.1$, whilst in the third example $f_3$ is equal to about $[2(f_2 + f_4) - x]/3.1$, the other examples demonstrating intermediate values.

As far as the thick lens constructions are concerned, Example 7 is of interest in that the second member includes a simple convergent component located between the two compound components instead of behind the two compound components. The eight example is of interest in that the third component includes a triplet component.

The third to fifth examples are preferably constructed, to meet requirements for live television applications, in accordance with the following relationships:

A. In the second member, the average value of the Abbe V numbers of the materials forming all the collective elements is at least twice the average value of the Abbe V numbers of the materials forming all the dispersive elements;

B. In the second member, the average value of the mean refractive indices of the materials of all the dispersive elements exceeds the average value of the mean refractive indices of the materials of all the collective elements by an amount lying between 0.15 and 0.25;

C. In the second member, the two compound components are doublet components each having an internal contact convex to the front, the radius of the internal contact of the front said doublet component being less than $4f_2$ and greater than the radius of the internal contact of the rear said doublet component, which latter radius is in turn greater than $f_2$;

D. The front surface of the second member has a radius lying between $3f_2$ and $\infty$;

E. The rear surfaces of the two compound components of the second member are concave to the front, the radius of the rear surface of the rear said compound component being less than $4f_2$ and greater than the radius of the rear surface of the front said compound component, which latter radius is in turn greater than $f_2$;

F. The rear surface of the second member has a radius of curvature lying between $5f_2$ and $\infty$;

G. In the third member, the compound component is a doublet component having an internal contact convex to the front and of radius lying between $0.8f_3$ and $2f_3$;

H. In the third member, the compound component comprises a collective element and a dispersive element of respective materials whose Abbe V numbers differ by between 20 and 30 and whose mean refractive indices differ by less than 0.1;

I. In the fourth member, the compound component is a double component having an internal contact convex to the front with radius lying between $2f_4$ and $f_4$, the two elements of said component being made of materials whose means refractive indices differ by between 0.2 and 0.3;

J. In the fourth member, the average value of the Abbe V numbers of the materials of all the collective elements exceeds the Abbe V number of the material of the dispersive element or the average of the Abbe V numbers of the materials of all the dispersive elements by at least 20;

K. In the fourth member, the radius of curvature of the front surface of the compound component exceeds that of the rear surface of said component, the latter radius being greater than $f_4$, whilst the radius of curvature of the rear surface of the simple component exceeds that of the front surface of said component, this latter radius also being greater than $f_4$.

However, for cinematographic applications, compliance only with the different and generally wider relationships previously stated under headings (1) to (6) is desirable; the third to fifth examples also comply with these wider relationships. With these wider relationships, the said headings (1) to (6) mention preferably limits. The eleven practical examples given show variations to the extreme of these preferable limits. However, it is possible to develop further practical examples of the same objective family based on optimized thin lens constructions substantially identical with those on which the tabulated examples are based. The thick lens parameters of such further examples may be outside the above-mentioned preferably limits, but generally within the wider relationships of headings (1) to (6). On the other hand, further examples like that of Example 1 may be developed, which lie outside the field of at least some of the relationships of headings (1) to (6). These may bebased on different optimized thin lens constructions developed in the manner previously explained, utilizing the specified relationships (a) and (b) which characterize the family of zoom objectives with which the invention is concerned.

Finally, it should be mentioned that, without resorting to the initial production of a thin lens design, it is possible to devise modifications of the above-described examples in which, for example to accentuate control and stabilization of certain aberrations, the parameters of the front assembly are varied. In this connection, it is believed that the various surface radii may be varied up to $0.5f$, where $f$ is $f_1$, $f_2$, $f_3$ or $f_4$, depending on which member or members contain the particular surface or surfaces undergoing modification, whilst the various lens thicknesses and axial arm separations may be varied to a corresponding extent, say up to $0.05f$, possibly in association with the selection of materials having differing refractive indices and Abbe V numbers, subject to the exclusion of negative values and impossible designs generally.

We claim:

1. An optical objective of variable focal length comprising a stationary rear assembly and a front assembly comprising four members of which the front member is divergent and stationary with respect to zooming and of which the second, third and fourth members are respectively convergent, divergent and convergent, the second and fourth members simultaneously moving forward during zooming towards maximum equivalent focal length in association with rearward movement of the third member, the said front assembly conforming to the relationships:

(a) $2.5Fm/N > f_2 > f_4 > f_3 > Fo$ (b) $\sqrt[1.5]{R} > g_3 > g_4 > g_2 > 1$, where $Fm$ is the maximum value of the equivalent focal length of the complete objective; N is the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; and R is the ratio of the maximum to the minimum equivalent focal lengths of the complete objective.

2. An optical objective according to claim 1, wherein the second, third and fourth members each comprise at least two components of which at least one is a compound component, said components being convergent in the second and fourth members and divergent in the third member, two components in the third member having an axial separation lying between $0.5f_3$ and $1.5f_3$.

3. An optical objective according to claim 2, wherein the third member comprises a compound component spaced to the rear of a simple component by an amount lying between $0.7f_3$ and $1.4f_3$.

4. A variable focal length objective according to claim 1, wherein the ranges of variations of the magnifications of the second and fourth members differ by an amount, depending on the difference between $f_2$ and $f_4$, such that the second and fourth members move equally during zooming.

5. A variable focal length objective according to claim 1, wherein $1.5 f_2 > f_1 > f_2$, where $f_1$ is the equivalent focal length of the front member.

6. An optical objective according to claim 2, wherein the second member comprises at least two compound components, the average value of the Abbe V numbers of the materials forming all the collective elements being at least twice the average value of the Abbe V numbers of the materials forming all the dispersive elements whilst the average value of the means refractive indices of the materials of all the dispersive elements exceeds the average value of the mean refractive indices of the materials of all the collective elements by an amount lying between 0.1 and 0.3.

7. An optical objective according to claim 2, wherein the second member comprises a front doublet component followed by two further components at least one of which is compound, the radius of curvature of the internal contact of the front doublet component being less than $4f_2$ whilst the rear surfaces of the front two components of said member are both concave to the front, the rear surface of the second component having a radius less than $6f_2$ greater than the radius of the rear surface of the front component, which is greater than $f_2$ and the radius of the rear surface of the second member has a radius exceeding $4f_2$.

8. An optical objective according to claim 2, wherein the third member includes a compound component having a collective internal contact surface with a radius of curvature lying between $0.8f_3$ and $3f_3$, said component comprising at least one collective element and at last one dispersive element, the average value of the Abbe V numbers of the materials of the dispersive element exceeding the average value of the Abbe V numbers of the materials of the collective element by an amount lying between 15 and 30, and the average value of the refractive indices of the materials of the collective element exceeding the average value of the refractive indices of the materials of the dispersive element by an amount lying between 0.005 and 0.15.

9. An optical objective according to claim 2, wherein the fourth member includes a compound component which is a doublet component having an internal contact convex to the front with radius lying between $0.7f_4$ and $1.7f_4$, the two elements of said component being made of materials whose mean refractive indices differ by between 0.1 and 0.3, while the average value of the Abbe V numbers of the materials of all the collective elements of the fourth member exceeds the average value of the Abbe V numbers of the materials of all the dispersive elements by at least 20.

10. An optical objective according to claim 2, wherein the fourth member comprises a compound component followed by a simple component, the front and rear surfaces of the compound component respectively having radii of curvature lying between $1.5f_4$ and $15f_4$, and between $0.7f_4$ and $5f_4$, and the front and rear surfaces of the simple component respectively having radii of curvature lying between $f_4$ and $3f_4$, and between $1.3f_4$ and $10f_4$.

11. An optical objective according to claim 1, wherein
(c) $f_2 > 0.6 Fm/N$
(d) $f_4 > 0.6 f_2$
(e) $\sqrt[3]{R} > g_2$
(f) $\sqrt[2]{R} > g_4$
(g) $\dfrac{2(f_2+f_4)-x}{2.5} > f_3 > \dfrac{2(f_2+f_4)-x}{5}$ where $x$ is the mean value of the sum of the distances from the rear nodal point of the second member to the front nodal point of the third member and from the rear nodal point of the third member to the front nodal point of the fourth member.

12. An optical objective according to claim 1, wherein
$f_2$ is greater than $Fm/N$;
$f_4$ lies between $0.5f_2$ and $0.9f_2$;
$g_4$ lies between 1.5 and 2.5;

$g_2$ lies between 1.1 and 2.0, and is always less than $g_4$; and
$f_3$ lies numerically between $z/4.5$ and $z/3$, where $z$ is equal to $2(f_2+f_4) - x$, $x$ being the mean value of the sum of the distances from the rear nodal point of the second member to the front nodal point of the third member and from the rear nodal point of the third member to the front nodal point of the fourth member.

13. A variable focal length objective consisting of a stationary rear assembly and a front assembly having four members of which the front member is divergent and stationary with respect to zooming and of which the second, third and fourth members are respectively convergent, divergent and convergent, and are movable for zooming to vary the equivalent focal length of the objective whilst keeping constant the position of the image plane throughout the range of variation, the second and fourth members simultaneously moving forward during zooming towards maximum focal length in association with rearward movement of the third member, the front assembly being characterized by the following relationships in combinations:
(h) $1.8\, Fm/N > f_2 > 0.6\, Fm/N$
(i) $f_2 > f_4$
(j) $\sqrt[3]{R} > g_2 > 1$
(k) $\sqrt[2]{R} > g_4 > g_2$
(l) $\dfrac{2(f_2+f_4)-x}{2.5} > f_3 > \dfrac{2(f_2+f_4)-x}{5}$;
(m) $\sqrt[1.5]{R} > g_3 > g_4$, where $Fm$ is the maximum value of the equivalent focal length of the complete objective; $N$ is the relative aperture of $f$ number of the objective; $f_2, f_3$ and $f_4$ are respectively the equivalent focal lengths of the second, third and fourth members; $g_2, g_3$ and $g_4$ are respectively the ratios between maximum and minimum magnifications of the second, third and fourth members; $R$ is the ratio of the maximum to minimum focal lengths of the complete objective; and $x$ is the mean value of the sum of the distances from the rear nodal point of the second member to the front nodal point of the third member and from the rear nodal point of the third member to the front nodal point of the fourth member.

14. An optical zoom objective comprising a stationary rear assembly and a front assembly comprising four members of which the front member is divergent and stationary with respect to zooming and of which the second, third and fourth members are respectively convergent, divergent and convergent, the second and fourth members simultaneously moving forward during zooming towards maximum equivalent focal length in association with rearward movement of the third member, the said front assembly conforming to the relationships:
(n) $1.8\, Fm/N > f_2 > 0.6\, Fm/N$;
(o) $f_2 > f_4 > 0.6 f_2$;
(p) $\sqrt[3]{R} > g_2 > 1$;
(q) $\sqrt[2]{R} > g_4 > g_2$;
(r) $\dfrac{2(f_2+f_4)-x}{2.5} > f_3 > \dfrac{2(f_2+f_4)-x}{5}$;
(s) $\sqrt[1.5]{R} > g_3 > g_4$.

where $Fm$ is the maximum value of the equivalent focal length of the complete objective; $N$ if the $f$-number of the objective; $f_2$, $f_3$ and $f_4$ are respectively the equivalent focal lengths of the second, third and fourth members; $g_2$, $g_3$ and $g_4$ are respectively the ratios between maximum and minimum magnifications of the second, third and fourth members; $R$ is the ratio of the maximum to the minimum equivalent focal lengths of the complete objective, and $x$ is the means value of the sum of the distances from the rear nodal point of the second member to the front point point of the third member and from the rear nodal point of the third member to the front nodal point of the fourth member.

15. An optical objective of variable focal length comprising a stationary rear assembly and a front assembly comprising four members of which the front member is divergent and stationary with respect to zooming and of which the second, third and fourth members are respectively convergent, divergent and convergent, the second and fourth members simultaneously moving forward during zooming towards maximum equivalent focal length in association with rearward movement of the third member, the said front assembly conforming to the relationships:

(a) $2.3Fm/N > f_2 > f_4 > f_3 > 1.5Fo$
(b) $\sqrt[1.9]{R} > > g_3 > g_4 > g_2 > 1.2$, where $Fm$ is the maximum value of the equivalent focal length of the complete objective; $N$ is the $f$-number of the objective; $f_2$, $f_3$ and $f_4$ are respectively the equivalent focal lengths of the second, third and fourth members $g_2$, $g_3$ and $g_4$ are respectively the ratios between maximum and minimum magnifications of the second, third and fourth members; and $R$ is the ratio of the maximum to the minimum equivalent focal lengths of the complete objective.

* * * * *

PO-1050
(5/69)

UNITED STATES PATENT OFFICE
CERTIFICATE OF CORRECTION

Patent No. 3,705,759        Dated December 12, 1972

Inventor(s) Gordon Henry Cook and Francois Laurent

It is certified that error appears in the above-identified patent and that said Letters Patent are hereby corrected as shown below:

In the heading, under "Foreign Application Priority Data"

Cancel: May 20, 1970     Great Britain ..... 39,112/70

Insert: January 16, 1967     Great Britain ..... 2231/67

May 30, 1969     Great Britain ..... 27,443/69

Signed and sealed this 8th day of May 1973.

(SEAL)
Attest:

EDWARD M.FLETCHER,JR.        ROBERT GOTTSCHALK
Attesting Officer                Commissioner of Patents